United States Patent
Hiroe et al.

(10) Patent No.: US 11,093,316 B2
(45) Date of Patent: Aug. 17, 2021

(54) ABNORMALITY DETECTION DEVICE, ABNORMALITY DETECTION METHOD, AND PROGRAM

(71) Applicant: MITSUBISHI HEAVY INDUSTRIES, LTD., Tokyo (JP)

(72) Inventors: Takaharu Hiroe, Tokyo (JP); Kazunari Ide, Tokyo (JP); Yoshikatsu Ikawa, Tokyo (JP); Ryo Sase, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 75 days.

(21) Appl. No.: 16/539,111

(22) Filed: Aug. 13, 2019

(65) Prior Publication Data
US 2020/0057690 A1  Feb. 20, 2020

(30) Foreign Application Priority Data
Aug. 16, 2018  (JP) .............................. JP2018-153060

(51) Int. Cl.
*G06F 11/00* (2006.01)
*G06F 11/07* (2006.01)

(52) U.S. Cl.
CPC ........ *G06F 11/079* (2013.01); *G06F 11/0751* (2013.01)

(58) Field of Classification Search
CPC ........................... G06F 11/079; G06F 11/0751
See application file for complete search history.

(56) References Cited

U.S. PATENT DOCUMENTS 6,711,503 B2 * 3/2004 Haaland .................... G01J 3/28
702/22
7,054,786 B2 * 5/2006 Sakano ............. H01J 37/32935
257/E21.252

(Continued)

FOREIGN PATENT DOCUMENTS

JP   H10-260722 A   9/1998
JP   2002-025981 A  1/2002
(Continued)

*Primary Examiner* — Jonathan D Gibson
(74) *Attorney, Agent, or Firm* — Osha Bergman Watanabe & Burton LLP

(57) ABSTRACT

An abnormality detection device includes a processor and a storage unit connected to the processor. The processor is configured to execute an error vector acquisition process of acquiring an error vector representing a difference between a measurement value vector having multiple measurement values measured at a determination time as elements and an average value vector having an average value of the measurement values accumulated in the storage unit as an element, a component acquisition process of acquiring a plurality of components into which the error vector is decomposed with respect to a direction of a singular vector, a comparing process of comparing a value obtained by squaring each of the components into which the error vector is decomposed with respect to the direction of the singular vector with corresponding variance in the direction of the singular vector individually with respect to the direction of the singular vector, and a determination process of performing an abnormality determination on the basis of plural compared results in the comparing process.

14 Claims, 12 Drawing Sheets

(56) References Cited

U.S. PATENT DOCUMENTS

| | | | |
|---|---|---|---|
| 8,355,808 B2* | 1/2013 | Inokawa | G06Q 10/06 |
| | | | 700/110 |
| 8,572,472 B2* | 10/2013 | Kurachi | G05B 9/03 |
| | | | 714/819 |
| 8,676,538 B2* | 3/2014 | Purdy | G05B 23/0221 |
| | | | 702/183 |
| 9,355,007 B1* | 5/2016 | Eicher | G06F 11/3428 |
| 10,592,328 B1* | 3/2020 | Thompson | G06F 11/0793 |
| 2004/0254761 A1* | 12/2004 | Sakano | H01J 37/32935 |
| | | | 702/182 |
| 2005/0157327 A1* | 7/2005 | Shoji | G06K 15/408 |
| | | | 358/1.14 |
| 2008/0198950 A1* | 8/2008 | Suyama | G06F 11/0751 |
| | | | 375/340 |
| 2010/0235140 A1* | 9/2010 | Satonaga | G06K 9/623 |
| | | | 702/179 |
| 2016/0132373 A1* | 5/2016 | Yoshinaga | G06N 7/005 |
| | | | 714/28 |
| 2016/0342903 A1* | 11/2016 | Shumpert | G06F 11/079 |
| 2018/0011479 A1* | 1/2018 | Nagase | G05B 23/0259 |
| 2018/0046529 A1* | 2/2018 | Togawa | G06F 11/0751 |
| 2020/0057690 A1* | 2/2020 | Hiroe | G06F 11/079 |

FOREIGN PATENT DOCUMENTS

| | | |
|---|---|---|
| JP | 2003-141306 A | 5/2003 |
| JP | 2004-303007 A | 10/2004 |
| JP | 5101396 B2 | 12/2012 |

* cited by examiner

ABNORMALITY DETECTION DEVICE, ABNORMALITY DETECTION METHOD, AND PROGRAM

BACKGROUND OF THE INVENTION

Field of the Invention

The present invention relates to an abnormality detection device, an abnormality detection method, and a program.

Priority is claimed on Japanese Patent Application No. 2018-153060, filed Aug. 16, 2018, the content of which is incorporated herein by reference.

Description of Related Art

As a technique for diagnosing the health of an inspection target, a method of detecting an abnormality using a Mahalanobis-Taguchi (MT) method is known. In the MT method, a Mahalanobis distance is calculated using the inverse matrix of a covariance matrix of reference data (for example, a group of measurement values of various characteristic items in a normal state).

In the MT method, there is the possibility of the accuracy of calculation of a Mahalanobis distance decreasing depending on the property of a covariance matrix obtained from the reference data. Specifically, for example, in a case where there is a strong correlation between characteristic items constituting the reference data (the absolute value of a correlation coefficient is close to 1), and a case where the number of pieces of data included in the reference data is smaller than the number of characteristic items, the inverse matrix of the covariance matrix is not able to be calculated, and thus there is the possibility of the accuracy of calculation of a Mahalanobis distance decreasing. As a countermeasure against this, in, for example, Japanese Unexamined Patent Application, First Publication No. 2003-141306, calculating the cofactor matrix of a correlation matrix instead of an inverse matrix, and using a method of calculating a Mahalanobis distance using this cofactor matrix (an MTA method) is considered. Since the correlation matrix is a normalized matrix of the covariance matrix so that each of diagonal element is "1", the same result can be obtained using the cofactor matrix of the covariance matrix instead of the cofactor matrix of the correlation matrix.

The MTA method disclosed in Japanese Unexamined Patent Application, First Publication No. 2003-141306 is effective in a case where the rank of the covariance matrix decreases by one compared with the number of characteristic values, but there is the possibility of a Mahalanobis distance not being able to be calculated in the case of decrease by two or more. For this reason, as another method, Japanese Patent No. 5101396 discloses a method of obtaining an approximate inverse matrix using the singular value resolution of a covariance matrix, and calculating a Mahalanobis distance using this approximate inverse matrix.

However, in a method of the related art as disclosed in Patent Document 2, an approximate inverse matrix is obtained by removing a component having a small singular value of a covariance matrix so that the component having a small singular value does not influence a Mahalanobis distance. Therefore, in a case where an abnormality occurs in an inspection target, and the influence of this abnormality appears in the component having a small singular value, in a method of substituting an approximate inverse matrix of the related art, there is the possibility of the sensitivity of abnormality detection decreasing.

SUMMARY OF THE INVENTION

According to at least one aspect of the present invention, there are provided an abnormality detection device, an abnormality detection method, and a program that make it possible to improve the accuracy of abnormality detection.

According to a first aspect of the present invention, there is provided an abnormality detection device that is configured to detect the presence or absence of an abnormality in a target device, the abnormality detection device including a processor and a storage unit connected to the processor. The processor is configured to execute an error vector acquisition process of acquiring an error vector representing a difference between a measurement value vector having multiple measurement values measured at a determination time as elements and an average value vector having an average value of reference data of the measurement values (measurement values acquired when a target device 2 is in a normal state) accumulated in the storage unit as an element; a component acquisition process of acquiring a plurality of components into which the error vector is decomposed with respect to a direction of a singular vector; a comparing process of comparing a value obtained by squaring each of the components into which the error vector is decomposed with respect to the direction of the singular vector with corresponding variance in the direction of the singular vector individually with respect to the direction of the singular vector; and a determination process of performing an abnormality determination on the basis of a plurality of compared results in the comparing process.

In this manner, the abnormality detection device compares the component with the variance with respect to the direction of the singular vector, and thus even in a case where the variance in the direction of the singular vector is zero or a small value, it can be used in an abnormality determination without being excluded. As a result, the abnormality detection device can suppress a decrease in the sensitivity of abnormality detection, and improve the accuracy of abnormality detection.

According to a second aspect of the present invention, in the abnormality detection device according to the first aspect, in the comparing process, the processor is configured to output the compared result indicating whether a difference between a value obtained by squaring each of the component into which the error vector is decomposed with respect to the direction of the singular vector and corresponding variance in the direction of the singular vector is equal to or greater than a predetermined threshold, and in the determination process, the processor is configured to determine an abnormality in a case where the number of compared results indicating that the difference is equal to or greater than the threshold is equal to or greater a predetermined upper-limit number.

In a technique using the MT method of the related art, a Mahalanobis distance is calculated using summation. Therefore, when a minute change occurs in a measurement value relevant to a component having a small singular value even in a case where the state of a target device is normal, the value of a Mahalanobis distance increases by this value, and thus there is the possibility of the accuracy of abnormality detection decreasing. In addition, in a case where there is an influence on only a measurement value relevant to a component having a large singular value even when the state of a target device is abnormal, there is the possibility of the sensitivity of abnormality detection decreasing without being greatly reflected in the value of a Mahalanobis distance of another normal value.

However, the abnormality detection device according to the present embodiment determines the presence or absence of an abnormality on the basis of compared results with respect to the direction of the singular vector, thereby allowing overdetection and oversight of the abnormality to be suppressed. In addition, since the presence or absence of an abnormality is determined on the basis of whether the number of compared results indicating that the difference is equal to or greater than the threshold exceeds the upper-limit number, the sensitivity of abnormality detection can be adjusted by this upper-limit number.

According to a third aspect of the present invention, in the abnormality detection device according to the first or second aspect, the processor is further configured to execute a frequency distribution calculation process of obtaining a percentile value corresponding to each of the components acquired at the determination time on the basis of a frequency distribution obtained from components into which the error vector is decomposed with respect to the direction of the singular vector and which are accumulated in the storage unit, and in the comparing process, the processor is configured to correct the variance on the basis of the percentile value.

The abnormality detection device corrects the variance on the basis of the percentile value which is data having a high degree of reliability in which the actual variation is reflected, and thus it is possible to further improve the accuracy of abnormality detection.

According to a fourth aspect of the present invention, in the abnormality detection device according to the first or second aspect, the processor is further configured to execute a frequency distribution calculation process of obtaining a frequency of occurrence corresponding to each of the components acquired at the determination time on the basis of a frequency distribution obtained from components into which the error vector is decomposed with respect to the direction of the singular vector and which are accumulated in the storage unit, and a normalization process of obtaining a probability density in which the component acquired at the determination time is observed using a probability distribution obtained by normalizing the frequency distribution on the basis of the frequency of occurrence, and in the comparing process, the processor is configured to correct the variance on the basis of the probability density.

In this manner, the abnormality detection device can further enhance statistical reliability than in a case where only the Mahalanobis distance is used as a reference for determination as in a technique of the related art. As a result, the abnormality detection device can further improve the accuracy of abnormality detection.

According to a fifth aspect of the present invention, in the abnormality detection device according to any one of the first to fourth aspects, the measurement value vector includes a first measurement value vector having the measurement values measured at the determination time as elements and a second measurement value vector having measurement values measured before the determination time as elements.

In a dynamic system in which output to input is not instantaneous (exhibits late response), there may be a dependent relationship between the measurement value at the determination time and the measurement value at the past time. Therefore, in a case where an abnormality determination is performed on the basis of only the measurement value at the determination time, this dependent relationship is not able to be considered, and thus there is the possibility of the accuracy of abnormality detection decreasing due to the occurrence of a calculation error. However, since the abnormality detection device according to the above-described aspect performs an abnormality determination on the basis of the measurement value vectors at the determination time and the past time, it is possible to reduce a calculation error resulting from the property of a dynamic system, and to further improve the accuracy of abnormality detection.

According to a sixth aspect of the present invention, in the abnormality detection device according to the fifth aspect, the second measurement value vector has fewer kinds of measurement values than the first measurement value vector as elements.

In this manner, the abnormality detection device can suppress an increase in the amount of calculation due to the addition of the second measurement value vector at the past time.

According to a seventh aspect of the present invention, in the abnormality detection device according to any one of the first to sixth aspects, the target device is configured of a plurality of devices of the same type, and in the error vector acquisition process, the processor is configured to acquire, as the error vector, a vector representing a difference between a measurement value vector with respect to the target device having measurement values measured in each of a plurality of the target devices as elements and an average value vector with respect to the target device accumulated in the storage unit.

In this manner, the abnormality detection device can determine the presence or absence of an abnormality on the basis of a difference between one target device and another target device among a plurality of target devices. Thereby, the abnormality detection device can further improve the accuracy of abnormality detection.

According to an eighth aspect of the present invention, there is provided an abnormality detection device that is configured to detect the presence or absence of an abnormality in a target device, the abnormality detection device including a processor and a storage unit connected to the processor. The processor is configured to execute an error vector acquisition process of acquiring an error vector representing a difference between a measurement value vector having multiple measurement values measured at a determination time as elements and an average value vector having an average value of the measurement values accumulated in the storage unit as an element, a component acquisition process of acquiring a component vector having components into which the error vector is decomposed with respect to a direction of a singular vector as elements, a Mahalanobis distance calculation process of calculating a Mahalanobis distance on the basis of the component vector, variance in the direction of the singular vector, and a correction coefficient with respect to the direction of the singular vector, and a determination process of determining the presence or absence of an abnormality on the basis of the Mahalanobis distance.

In this manner, since the abnormality detection device can adjust the contribution ratio of the variance with the correction coefficient, it is possible to improve the accuracy of calculation of a Mahalanobis distance, and to improve the accuracy of abnormality detection.

According to a ninth aspect of the present invention, in the abnormality detection device according to the eighth aspect, the processor is further configured to execute a frequency distribution calculation process of obtaining a percentile value corresponding to each of the components acquired at the determination time on the basis of a frequency distribution obtained from components into which the error vector is decomposed with respect to the direction of the singular vector which are accumulated in the storage unit, and in the Mahalanobis distance calculation process, the processor is configured to correct the correction coefficient on the basis of the percentile value.

The abnormality detection device corrects the correction coefficient on the basis of the percentile value which is data having a high degree of reliability in which the actual variation is reflected in this manner, and thus it is possible to further improve the accuracy of calculation of a Mahalanobis distance.

According to a tenth aspect of the present invention, in the abnormality detection device according to the eighth aspect, the processor is further configured to execute a frequency distribution calculation process of obtaining a frequency of occurrence corresponding to each of the components acquired at the determination time on the basis of a frequency distribution obtained from components into which the error vector is decomposed with respect to the direction of the singular vector and which are accumulated in the storage unit, and a normalization process of obtaining a probability density in which the component acquired at the determination time is observed on the basis of the frequency of occurrence and a probability distribution obtained by normalizing the frequency distribution, and in the Mahalanobis distance calculation process, the processor is configured to correct the correction coefficient on the basis of the probability density.

In this manner, the abnormality detection device can further enhance statistical reliability than in a case where only the Mahalanobis distance is used as a reference for determination as in a technique of the related art. As a result, the abnormality detection device can further improve the accuracy of calculation of a Mahalanobis distance.

According to an eleventh aspect of the present invention, there is provided an abnormality detection method including: an error vector acquisition step of acquiring an error vector representing a difference between a measurement value vector having multiple measurement values measured at a determination time as elements and an average value vector having an average value of the measurement values accumulated in a storage unit as an element; a component acquisition step of acquiring a plurality of components into which the error vector is decomposed with respect to a direction of a singular vector; a comparing step of comparing a value obtained by squaring each of the components into which the error vector is decomposed with respect to the direction of the singular vector with corresponding variance in the direction of the singular vector individually with respect to the direction of the singular vector; and a determination step of determining the presence or absence of an abnormality on the basis of a plurality of compared results in the comparing step.

According to a twelfth aspect of the present invention, there is provided an abnormality detection method including: an error vector acquisition step of acquiring an error vector representing a difference between a measurement value vector having multiple measurement values measured at a determination time as elements and an average value vector having an average value of the measurement values accumulated in a storage unit as an element; a component acquisition step of acquiring a component vector having components into which the error vector is decomposed with respect to a direction of a singular vector as elements; a Mahalanobis distance calculation step of calculating a Mahalanobis distance on the basis of the component vector, variance in the direction of the singular vector, and a correction coefficient with respect to the direction of the singular vector; and a determination step of determining the presence or absence of an abnormality on the basis of the Mahalanobis distance.

According to a thirteenth aspect of the present invention, there is provided a program for causing a computer of an abnormality detection device including a processor and a storage unit connected to the processor to function, the program causing the processor to execute: an error vector acquisition process of acquiring an error vector representing a difference between a measurement value vector having multiple measurement values measured at a determination time as elements and an average value vector having an average value of the measurement values accumulated in the storage unit as an element; a component acquisition process of acquiring a plurality of components into which the error vector is decomposed with respect to a direction of a singular vector; a comparing process of comparing a value obtained by squaring each of the components with respect to the direction of the singular vector with corresponding variance in the direction of the singular vector individually with respect to the direction of the singular vector; and a determination process of determining the presence or absence of an abnormality on the basis of a plurality of compared results in the comparing process.

According to a fourteenth aspect of the present invention, there is provided a program for causing a computer of an abnormality detection device including a processor and a storage unit connected to the processor to function, the program causing the processor to execute: an error vector acquisition process of acquiring an error vector representing a difference between a measurement value vector having multiple measurement values measured at a determination time as elements and an average value vector having an average value of the measurement values accumulated in the storage unit as an element; a component acquisition process of acquiring a component vector having components into which the error vector is decomposed with respect to a direction of a singular vector as elements; a Mahalanobis distance calculation process of calculating a Mahalanobis distance on the basis of the component vector, variance in the direction of the singular vector, and a correction coefficient with respect to the direction of the singular vector; and a determination process of determining the presence or absence of an abnormality on the basis of the Mahalanobis distance.

According to the abnormality detection device, the abnormality detection method, and the program of any one of the above-described aspects, it is possible to improve the accuracy of abnormality detection.

DETAILED DESCRIPTION OF THE INVENTION

First Embodiment

Hereinafter, an abnormality detection system 1 according to a first embodiment of the present invention will be described with reference to FIGS. 1 and 2.

(Overall Configuration of Abnormality Detection System)

Figure 1:
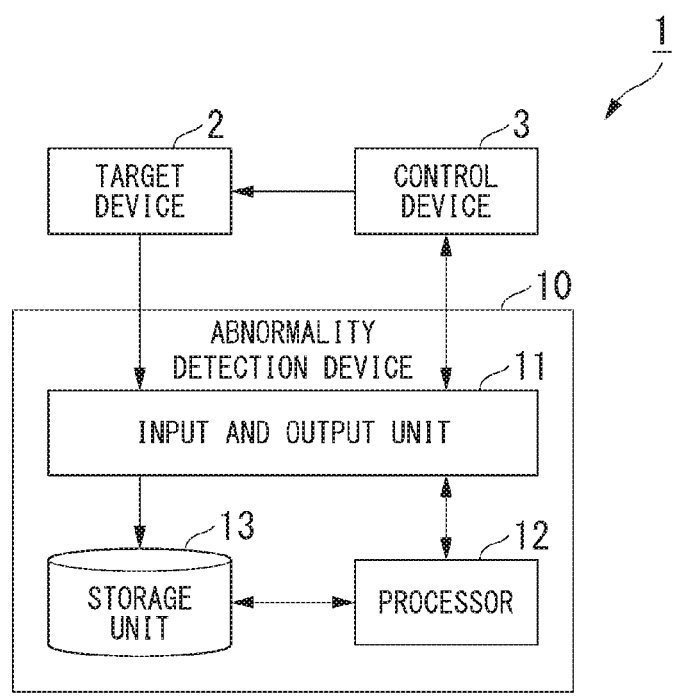
FIG. 1 is a diagram showing an overall configuration of an abnormality detection system according to a first embodiment.

FIG. 1 is a diagram showing an overall configuration of an abnormality detection system according to the first embodiment.

As shown in FIG. 1, the abnormality detection system 1 includes a target device 2, a control device 3, and an abnormality detection device 10.

In the abnormality detection system 1, the target device 2 is a device which is a target for abnormality determination. The target device 2 according to the present embodiment is, for example, a device constituting a gas turbine combined cycle power generation plant such as a gas turbine, a steam turbine, or a boiler. In addition, the target device 2 may be, for example, a device constituting another power generation plant such as an environmental plant or a chemical plant.

The control device 3 generates a control signal for controlling the target device 2. The target device 2 operates in accordance with the control signal from the control device 3.

The abnormality detection device 10 detects the presence or absence of an abnormality in the target device 2.

In addition, in a case where the abnormality of the target device 2 is detected, the abnormality detection device 10 notifies the control device 3 of a detection result. The control device 3 performs control for resolving the abnormal state of the target device 2 on the basis of the detection result of the abnormality detection device 10.

In addition, as shown in FIG. 1, the abnormality detection device 10 includes an input and output unit 11, a processor 12, and a storage unit 13.

The input and output unit 11 accepts input of multiple measurement values relevant to the target device 2 for each predetermined sampling period. In addition, the input and output unit 11 outputs the detection result of the abnormality detection device 10 to the control device 3.

The measurement value includes the value of the state amount of the target device 2. The state amount is, for example, atmospheric temperature, atmospheric pressure, air temperature and pressure at the inlet and outlet of a compressor, pressure and temperature of fuel in a combustor, combustion gas temperature and pressure at the inlet and outlet of a gas turbine, output of a gas turbine, rotational speed of a rotary shaft, vibration, or the like.

In addition, the measurement value may include a control signal transmitted to the target device 2 by the control device 3.

The processor 12 takes charge of the entire operation of the abnormality detection device 10.

The processor 12 according to the present embodiment performs a process of detecting the presence or absence of an abnormality of the target device 2 on the basis of the measurement value acquired through the input and output unit 11.

The storage unit 13 is connected to the input and output unit 11 and the processor 12. A bundle of measurement values acquired for each sampling period are accumulated in the storage unit 13 in a time-series manner.

(Functional Configuration of Abnormality Detection Device)

Figure 2:
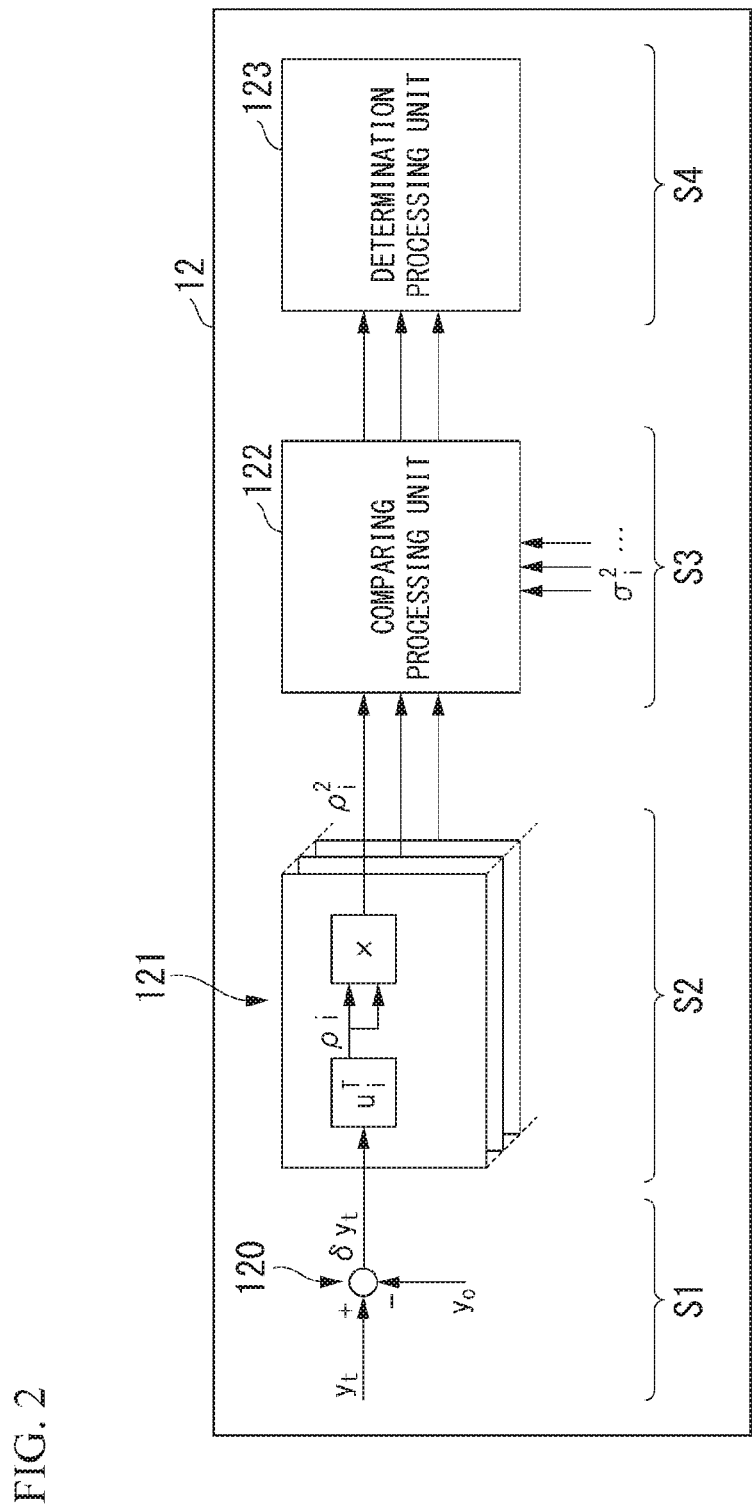
FIG. 2 is a diagram showing a functional configuration of a processor of an abnormality detection device according to the first embodiment.

FIG. 2 is a diagram showing a functional configuration of a processor of an abnormality detection device according to the first embodiment. As shown in FIG. 2, the processor 12 of the abnormality detection device 10 includes an error vector acquisition unit 120, a component acquisition unit 121, a comparing processing unit 122, and a determination processing unit 123. The processor 12 exhibits the functions of these functional units by operating in accordance with a predetermined program.

The error vector acquisition unit 120 performs an "error vector acquisition process S1" of acquiring an error vector $\delta y_t$ representing a difference between a measurement value vector $y_t$ having multiple measurement values as elements measured at a determination time t and an average value vector $y_0$ having an average value of the measurement values accumulated in the storage unit 13 as an element.

The measurement value vector $y_t$ is, for example, a vector including measurement values $(x_1, x_2, \ldots, x_m)$ for in kinds of items as elements.

The average value vector $y_0$ is a vector including average values $(\mu_1, \mu_2, \ldots, \mu_m)$ of measurement values with respect to items calculated from measurement values acquired when the target device 2 is in a normal state (hereinafter, also referred to as "reference data y") as elements.

The error vector $\delta y_t$ is a vector including errors $(x_1-\mu_1, x_2-\mu_2, \ldots, x_m-\mu_m)$ between each element of the measurement value vector $y_t$ and the corresponding element of the average value vector $y_0$ as elements, and is represented by the following Expression (1).

$$\delta y_t = (y_t - y_0) \quad (1)$$

The component acquisition unit 121 performs a "component acquisition process S2" of acquiring a plurality of components $\rho_i$ into which the error vector $\delta y_t$ is decomposed with respect to a direction of a singular vector. Specifically, the component acquisition unit 121 acquires the components $\rho_i$ as follows.

First, the component acquisition unit 121 obtains a covariance matrix $Q_0$ of reference data y (hereinafter, also referred to as "unit space") accumulated in the storage unit 13. The covariance matrix $Q_0$ is represented by the following Expression (2). In the Expression (2), a superscript symbol "T" on the right denotes a transpose.

$$Q_0 = E[(y-y_0)^T(y-y_0)] \qquad (2)$$

Next, the component acquisition unit 121 resolves the covariance matrix $Q_0$ into singular values as in the following Expression (3).

$$Q_0 = [\,u_1 \ u_2 \ \cdots \ u_m\,] \begin{bmatrix} \sigma_1^2 & 0 & \cdots & 0 \\ 0 & \sigma_2^2 & \cdots & 0 \\ \vdots & \vdots & \ddots & \vdots \\ 0 & 0 & \cdots & \sigma_m^2 \end{bmatrix} [\,v_1 \ v_2 \ \cdots \ v_m\,]^T \qquad (3)$$

In addition, as shown in Expression (2), the covariance matrix $Q_0$ is obtained by squaring and thus has a symmetry property. Therefore, Expression (3) can be replaced with the following Expression (4).

$$Q_0 = [\,u_1 \ u_2 \ \cdots \ u_m\,] \begin{bmatrix} \sigma_1^2 & 0 & \cdots & 0 \\ 0 & \sigma_2^2 & \cdots & 0 \\ \vdots & \vdots & \ddots & \vdots \\ 0 & 0 & \cdots & \sigma_m^2 \end{bmatrix} [\,u_1 \ u_2 \ \cdots \ u_m\,]^T \qquad (4)$$

Next, the component acquisition unit 121 obtains components $\rho_i$ into which the error vector $\delta y_t$ is decomposed with respect to the direction of the singular vector $u_i^T$ (i=1, 2, . . . , m) using the following Expression (5). The value of $u_i$ does not change unless the reference data y changes. Therefore, in a case where $u_i$ is accumulated in the storage unit 13 similarly to the reference data y, it is not necessary to solve Expression (4) every time.

$$\rho_i = u_i^T \cdot \delta y_t \qquad (5)$$

Meanwhile, the component acquisition unit 121 according to the present embodiment outputs values $\rho_i^2$ obtained by squaring each of the components $\rho_i$ into which the error vector $\delta y_t$ is decomposed with respect to the direction of the singular vector $u_i^T$ to the comparing processing unit 122.

The comparing processing unit 122 performs a "comparing process S3" of comparing each of the components $\rho_i$ into which the error vector $\delta y_t$ is decomposed with respect to the direction of the singular vector $u_i^T$ with corresponding variances $\sigma_i^2$ in the direction of the singular vector $u_i^T$ individually with respect to the directions of the singular vectors.

The variances $\sigma_i^2$ (i=1, 2, . . . , m) of the singular vector are singular values ($\sigma_1^2, \sigma_2^2, \ldots, \sigma_m^2$) of the covariance matrix $Q_0$ (unit space) represented in Expression (4), and represent variations with respect to the directions of singular vectors when the target device 2 is in a normal state.

Here, the values $\rho_i^2$ (i=1, 2, . . . , m) obtained by squaring each of the components $\rho_i$ (i=1, 2, . . . , m) input from the component acquisition unit 121 represent variations with respect to the directions of singular vectors at the determination time t. Therefore, in a case where the state of the target device 2 at the determination time t is normal, the value $\rho_i^2$ obtained by squaring each of the component $\rho_i$ is supposed to be a value close to the variance $\sigma_i^2$. Based on such a premise, the comparing processing unit 122 compares the values $\rho_i^2$ obtained by squaring each of the components $\rho_i$ with the variances $\sigma_i^2$ with respect to directions of singular vectors, and outputs the compared results to the determination processing unit 123.

For example, the comparing processing unit 122 compares the value $\rho_i^2$ obtained by squaring each of the component $\rho_i$ with the corresponding variance $\sigma_i^2$, and outputs compared results indicating whether the difference is equal to or greater than a predetermined threshold to the determination processing unit 123. Meanwhile, in a case where variation of a component $\rho_i$ is a normal distribution, the threshold is appropriate to be set to be at least about 9 times the value of $\sigma_i^2$.

Incidentally, in a technique using an MT method of the related art, a Mahalanobis distance $D_M(y_t)$ at measurement time t is obtained by the following Expression (6).

$$D_M(y_t) = \sqrt{(y_t - y_0)^T Q_0^{-1}(y_t - y_0)} \qquad (6)$$
$$= \sqrt{(y_t - y_0)^T \sum_{i=1}^{m} \frac{u_i^T u_i}{\sigma_i^2}(y_t - y_0)}$$

In this manner, in a technique using the MT method of the related art, in a case where zero is included in a singular value (variance $\sigma_i^2$) when the inverse matrix $Q_0^{-1}$ of the covariance matrix $Q_0$ is calculated, there is the possibility of the accuracy of calculation of a Mahalanobis distance decreasing due to division by zero.

Therefore, the comparing processing unit 122 according to the present embodiment suppresses the occurrence of division by zero by performing the comparing process S3 of comparing the value $\rho_i^2$ of the square of the component $\rho_i$ into which the error vector is decomposed with the variance $\sigma_i^2$ with respect to the directions of singular vectors instead of the calculation of a Mahalanobis distance.

The determination processing unit 123 performs a "determination process S4" of determining the presence or absence of an abnormality on the basis of the compared results of the comparing processing unit 122.

For example, in a case where the number of compared results indicating that a difference between the value $\rho_i^2$ obtained by squaring each of the component $\rho_i$ and the corresponding variance $\sigma_i^2$ is equal to or greater than a threshold is equal to or greater than a predetermined upper-limit number, the determination processing unit 123 determines that an abnormality has occurred in the target device 2. Meanwhile, as the upper-limit number, any number equal to or greater than 1 is set.

The abnormality detection device 10 repeats the above-described processes S1 to S4 at predetermined timings, and detects the presence or absence of an abnormality of the target device 2.

In a case where the processor 12 has detected the abnormality of the target device 2, the input and output unit 11 notifies the control device 3 of the detection results. The control device 3 performs control for resolving the abnormal state of the target device 2 on the basis of the detection results of the abnormality detection device 10. For example, in a case where the target device 2 is a gas turbine, the control device 3 may perform control for lowering supply of fuel in order to lower output of a gas turbine.

In addition, the control device 3 may perform control for notifying an operator of the target device 2 that an abnormality has been detected. Here, the notification control is, for example, control for transmitting a message that an abnormality has been detected in an operator destination, control for displaying that an abnormality has been detected on an operator's operation screen, or the like.

(Operational Effect)

As described above, the abnormality detection device 10 according to the present embodiment is the abnormality detection device 10 that is configured to detect the presence or absence of an abnormality in the target device 2, and includes the processor 12 and the storage unit 13 which is connected to the processor 12. The processor 12 executes the error vector acquisition process S1 of acquiring an error vector $\delta y_t$ representing a difference between a measurement value vector $y_t$ having multiple measurement values measured at the determination time t as elements and an average value vector $y_0$ having an average value of measurement values accumulated in the storage unit 13 as an element, the component acquisition process S2 of acquiring a plurality of components $\rho_i$ into which the error vector $\delta y_t$ is decomposed with respect to the direction of the singular vector $u_i^T$, the comparing process S3 of comparing a value $\rho_i^2$ obtained by squaring each of the components $\rho_i$ into which the error vector $\delta y_t$ is decomposed with respect to the direction of the singular vector with corresponding variance $\sigma_i^2$ in the direction of the singular vector individually with respect to the direction of the singular vector, and the determination process S4 of performing an abnormality determination on the basis of a plurality of compared results in the comparing process S3.

In a technique using the MT method of the related art, as described above, in a case where a correlation between the pieces of reference data is strong, the inverse matrix of a covariance matrix is not able to be calculated, and thus there is the possibility of the accuracy of calculation of a Mahalanobis distance decreasing. Therefore, in, for example, Patent Document 2, after the inverse matrix of a covariance matrix is calculated, a matrix obtained by replacing a component having a small singular value (that is, variance) with zero is used as an approximate inverse matrix. With respect to a component having a small singular value, this is essentially the same as reversely replacing the value of the singular value with infinity. The component having a small singular value is ignored rather than approximated. Therefore, in a case where an abnormality occurs in an inspection target, and the influence of this abnormality appears in the component having a small singular value, in a method of substituting an approximate inverse matrix of the related art, there is a possibility of the sensitivity of abnormality detection decreasing.

However, the abnormality detection device 10 according to the present embodiment compares the component $\rho_i$, into which the error vector is decomposed with respect to the direction of a singular vector, with the variance $\sigma_i^2$, thereby allowing the vector itself to be used in an abnormality determination without performing the abnormality determination on the basis of a Mahalanobis distance which is a scalar value calculated from each vector. Thereby, it is not necessary to consider a deterioration in the accuracy of calculation due to division by zero, and thus even in a case where the variance $\sigma_i^2$ in the direction of a singular vector is zero or a small value, the abnormality detection device can be used in an abnormality determination without excluding them. As a result, the abnormality detection device 10 can suppress a decrease in the sensitivity of abnormality detection, and improve the accuracy of abnormality detection.

In addition, the processor 12 outputs, in the comparing process S3, compared results indicating whether a difference between the value $\rho_i^2$ obtained by squaring each of the component $\rho_i$ into which the error vector is decomposed with respect to the direction of the singular vector and the corresponding variance $\sigma_i^2$ in the direction of the singular vector is equal to or greater than a predetermined threshold, and determines, in the determination process S4, an abnormality in a case where the number of compared results indicating that the difference is equal to or greater than the threshold is equal to or greater than a predetermined upper-limit number.

In a technique using the MT method of the related art, a Mahalanobis distance is calculated using summation. Therefore, when a minute change occurs in a measurement value relevant to a component having a small singular value even in a case where the state of a target device is normal, the value of a Mahalanobis distance increases by this value, and thus there is the possibility of the accuracy of abnormality detection decreasing. In addition, in a case where there is an influence on only a measurement value relevant to a component having a large singular value even when the state of a target device is abnormal, there is the possibility of the sensitivity of abnormality detection decreasing without being greatly reflected in the value of a Mahalanobis distance by another normal value.

However, the abnormality detection device 10 according to the present embodiment determines the presence or absence of an abnormality on the basis of compared results with respect to the direction of the singular vector, thereby allowing overdetection and oversight of the abnormality to be suppressed. In addition, since the presence or absence of an abnormality is determined on the basis of whether the number of compared results indicating that the difference is equal to or greater than the threshold exceeds the upper-limit number, the sensitivity of abnormality detection can be adjusted by this upper-limit number. For example, since the abnormality detection device 10 determines an abnormality in a case where there is at least one compared result indicating that the difference is equal to or greater than the threshold by setting the upper-limit number to 1, it is possible to greatly improve the sensitivity of abnormality detection.

Modification Example of First Embodiment

Hereinbefore, the abnormality detection device 10 according to the first embodiment has been described, but the specific aspects of the abnormality detection device 10 are not limited to those described above, and various design changes and the like can be made without departing from the scope of this invention.

Hereinafter, a modification example of the first embodiment will be described with reference to FIG. 3. Meanwhile, common components with respect to those in the first embodiment are denoted by the same reference numerals and signs, and thus a detailed description thereof will not be given.

(Functional Configuration of Abnormality Detection Device)

Figure 3:
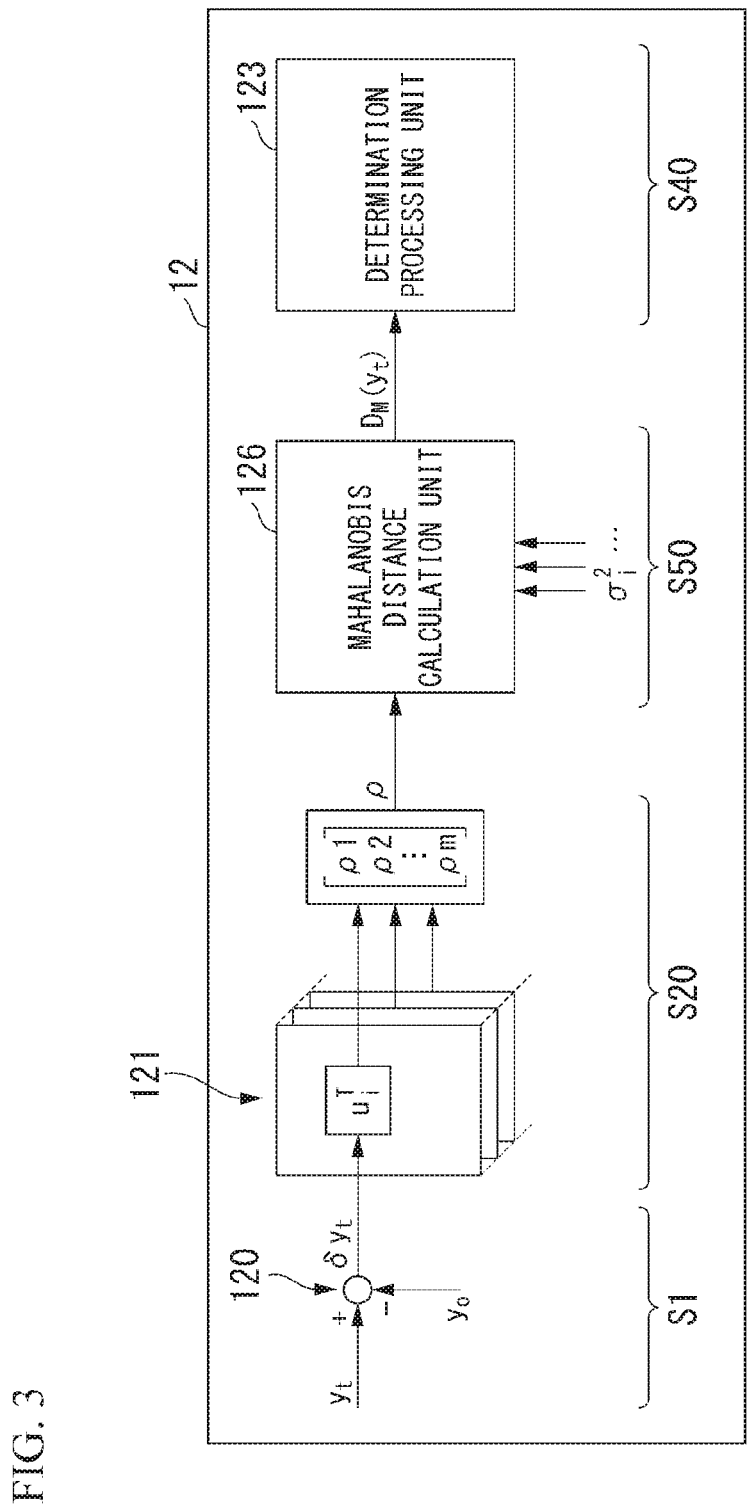
FIG. 3 is a diagram showing a functional configuration of a processor of an abnormality detection device according to a modification example of the first embodiment.

FIG. 3 is a diagram showing a functional configuration of a processor of an abnormality detection device according to a modification example of the first embodiment.

As shown in FIG. 3, a processor 12 of an abnormality detection device 10 according to the present modification example includes a Mahalanobis distance calculation unit 126 instead of the comparing processing unit 122 of the first embodiment.

The function of the error vector acquisition unit 120 ("error vector acquisition process S1") according to the present modification example is the same as that in the first embodiment.

The component acquisition unit 121 performs a "component acquisition process S20" of acquiring a component vector $\rho$ having a plurality of components $\rho_i$ into which the error vector $\delta y_t$ is decomposed with respect to the direction of the singular vector as elements.

Specifically, the component acquisition unit 121 first performs the same process as the "component acquisition process S2" of the first embodiment, and obtains the components $\rho_i$ into which the error vector $\delta y_t$ is decomposed with respect to the direction of the singular vector $u_i^T$. The component acquisition unit 121 outputs the component vector $\rho$ having the components $\rho_i$ (i=1, 2, ... , m) into which the error vector $\delta y_t$ is decomposed with respect to the direction of the singular vector $u_i^T$ as elements to the Mahalanobis distance calculation unit 126.

The Mahalanobis distance calculation unit 126 performs a "Mahalanobis distance calculation process S50" of calculating a Mahalanobis distance $D_M(y_t)$ on the basis of the component vector $\rho$, variance $\sigma_i^2$ in the direction of the singular vector, and correction coefficients $k_i$ (i=1, 2, ... , m) with respect to the direction of the singular vector.

In addition, in the present modification example, the correction coefficient $k_i$ is used for correcting a difference between the actual distribution and normal distribution of the components $\rho_i$. In the case of normal distribution, the probability of $\rho_i$ being included in a range equal to or less than $\pm 3\sigma_i$ is 99.73%, and thus it is natural to doubt an abnormality in a case where $\rho_i$ is out of a range of $\pm 3\sigma_i$. In a case where the actual distribution of $\rho_i$ has been inspected from the reference data y, for example, a case where the probability of being equivalent to 99.73% described above is in a range of $\pm 5\sigma_i$, $\rho_i$ is a distribution having a heavier hem than normal distribution, that is, is estimated to have a greater variation of $\rho_i$ than in normal distribution. Therefore, the value of $k_i$ is set to be smaller than 1, for example, (3/5), and it is rational to consider a decrease in variation.

Specifically, the Mahalanobis distance calculation unit 126 calculates the Mahalanobis distance $D_M(y_t)$ using the following Expression (7).

$$D_M(y_t) = \sqrt{\rho^T \sum_{i=1}^{m} \frac{k_i}{\sigma_i^2} \rho} \quad (7)$$

The determination processing unit 123 performs a "determination process S40" of determining the presence or absence of an abnormality on the basis of the Mahalanobis distance $D_M(y_t)$.

Specifically, in a case where the Mahalanobis distance $D_M(y_t)$ is equal to or greater than a predetermined value obtained from a unit space, for example, the determination processing unit 123 determines that an abnormality has occurred in the target device 2.

(Operational Effect)

As described above, in the abnormality detection device 10 according to the present modification example, the processor 12 executes the Mahalanobis distance calculation process S50 instead of the comparing process S3. In addition, the processor 12 acquires the component vector $\rho$ having the plurality of components $\rho_i$ into which the error vector $\delta y_t$ is decomposed with respect to the direction of the singular vector $u_i^T$ as elements in the component acquisition process S20, calculates a Mahalanobis distance on the basis of the component vector $\rho$, the variance $\sigma_i^2$ in the direction of the singular vector, and the correction coefficients $k_i$ with respect to the direction of the singular vector in the Mahalanobis distance calculation process S50, and determines the presence or absence of an abnormality on the basis of the Mahalanobis distance in the determination process S40.

In addition, in the correction coefficient $k_i$, any value is set in advance with respect to the direction of the singular vector.

In this manner, the abnormality detection device 10 can adjust the contribution ratio of the variance $\sigma_i^2$ with the correction coefficient $k_i$, and thus it is possible to improve the accuracy of calculation a Mahalanobis distance. For example, the value of a certain variance $\sigma_1^2$ obtained from a unit space is assumed to be small (variation is assumed to be small). Here, in spite of the state of the target device 2 is normal, an event such as an operator's operation of the target device 2 is caused, and thus there is the possibility of the component $\rho_1$ corresponding to this variance $\sigma_1^2$ being temporarily fluctuated. In this case, in a technique using the MT method of the related art, the fluctuation of such a component $\rho_1$ influences the value of a Mahalanobis distance, and thus there is the possibility of the accuracy of abnormality detection decreasing. However, in a case where the fluctuation of such a component $\rho_1$ is known in advance, on the experimental rule, the abnormality detection device 10 according to the present modification example can set the value of the correction coefficient $k_1$ in accordance with the width of this fluctuation. In this manner, the abnormality detection device 10 adjusts the correction coefficient $k_i$ in accordance with the characteristics of the target device 2, thereby allowing the accuracy of abnormality detection to be improved.

Second Embodiment

Next, an abnormality detection system 1 according to a second embodiment of the present invention will be described with reference to FIG. 4. Meanwhile, common components with respect to those in the embodiment and the modification example described above are denoted by the same reference numerals and signs, and thus a detailed description thereof will not be given.

(Functional Configuration of Abnormality Detection Device)

Figure 4:
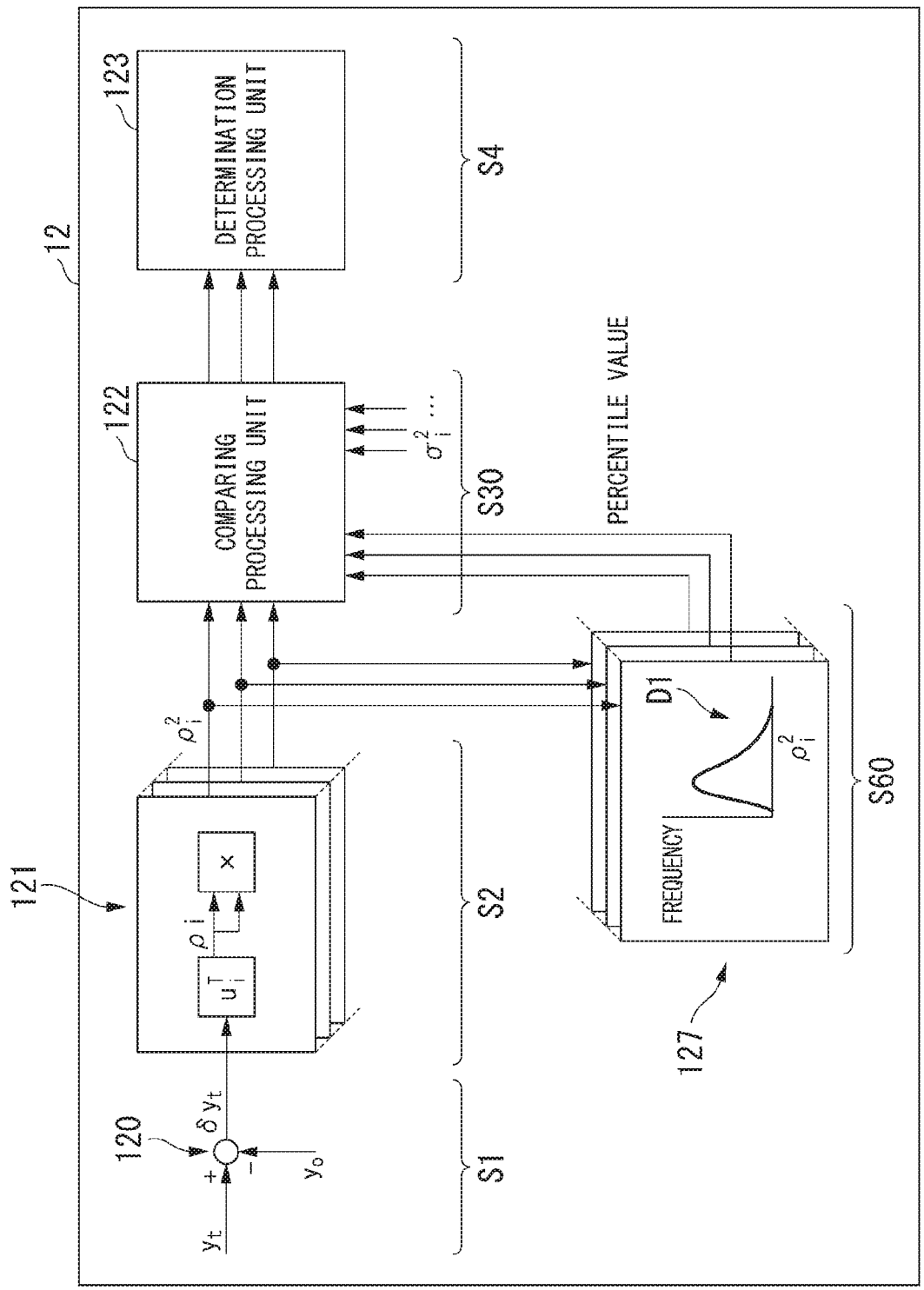
FIG. 4 is a diagram showing a functional configuration of a processor of an abnormality detection device according to a second embodiment.

FIG. 4 is a diagram showing a functional configuration of a processor of an abnormality detection device according to the second embodiment.

As shown in FIG. 4, a processor 12 of an abnormality detection device 10 according to the present embodiment includes a frequency distribution calculation unit 127 in addition to each functional unit of the first embodiment.

The function of the error vector acquisition unit 120 ("error vector acquisition process S1"), the function of the component acquisition unit 121 ("component acquisition process S2"), and the function of the determination processing unit 123 ("determination process S4") according to the present embodiment are the same as those in the first embodiment. Meanwhile, in the present embodiment, the value $\rho_i^2$ obtained by squaring each of the component $\rho_i$ into which the error vector $\delta y_t$ is decomposed with respect to the direction of the singular vector acquired by the component acquisition unit 121 is output to the frequency distribution calculation unit 127, and is stored in the storage unit 13. That is, values $\rho_i^2$ from time t−n at which the abnormality detection device 10 starts abnormality detection on the basis of the reference data y to latest determination time t are accumulated in the storage unit 13 as a history from moment to moment.

The frequency distribution calculation unit 127 performs a "frequency distribution calculation process S60" of obtaining a percentile value corresponding to each of the components $\rho_i$ (values $\rho_i^2$) acquired at the determination time t on the basis of a frequency distribution D1 obtained from the values $\rho_i^2$ obtained by squaring each of the components $\rho_i$ into which the error vector $\delta y_t$ is decomposed with respect to the direction of the singular vector and which are accumulated in the storage unit 13.

Specifically, the frequency distribution calculation unit 127 reads out a history of the values $\rho_i^2$ accumulated in the storage unit 13, and obtains the frequency distribution D1 of values $\rho_i^2$ from time t−n at which abnormality detection is started to time t−1 before one step of current determination time t. In the frequency distribution D1, the horizontal axis represents the value of $\rho_i^2$, and the vertical axis represents the frequency of occurrence of $\rho_i^2$.

The frequency distribution calculation unit 127 obtains a percentile value associated with the value $\rho_i^2$ at the determination time t which is output from the component acquisition unit 121 on the basis of the frequency distribution D1, and outputs the obtained value to the comparing processing unit 122.

The comparing processing unit 122 performs a "comparing process S30" of comparing the value $\rho_i^2$ obtained by squaring each of the component $\rho_i$ into which the error vector $\delta y_t$ is decomposed with respect to the direction of the singular vector $u_i^T$ with the corresponding variance $\sigma_i^2$ in the direction of the singular vector $u_i^T$ individually with respect to the direction of the singular vector.

In this case, the comparing processing unit 122 according to the present embodiment corrects the variance $\sigma_i^2$ on the basis of the percentile value which is output from the frequency distribution calculation unit 127.

The content of a specific process in which the comparing processing unit 122 compares the value $\rho_i^2$ with the variance $\sigma_i^2$ after correction is the same as that in the first embodiment.

(Operational Effect)

As described above, in the abnormality detection device 10 according to the present embodiment, the processor 12 further executes the frequency distribution calculation process S60 of obtaining a percentile value corresponding to each of the components $\rho_i$ acquired at the determination time t on the basis of the frequency distribution D1 obtained from the components $\rho_i$ into which the error vector $\delta y_t$ is decomposed with respect to the direction of the singular vector and which are accumulated in the storage unit, and corrects the variance $\sigma_i^2$ on the basis of the percentile value in the comparing process S30.

The unit space is based on the reference data y acquired when the target device 2 is in a normal state, but the number of samples included in this reference data y is constant (for example, three times the number m of items of measurement values). On the other hand, as the operating time of the abnormality detection device 10 becomes longer, a greater number of samples are accumulated in the storage unit 13 of the abnormality detection device 10. Therefore, in a case where the number of samples accumulated in the storage unit 13 is greater than the number of samples in the unit space, the statistical reliability of the samples accumulated in the storage unit 13 becomes higher.

Specifically, for example, the result of comparing of the value $\rho_1^2$ at the determination time t with the corresponding variance $\sigma_1^2$ exceeds a threshold, but according to the percentile value of an actual value $\rho_1^2$, the possibility of occurrence may seem to be high. In addition, the result of comparing of the value $\rho_1^2$ with the corresponding variance $\sigma_1^2$ is less than the threshold, but according to the percentile value of an actual value $\rho_1^2$, the possibility of occurrence may seem to be low. In this manner, actual variation is likely to be smaller (or greater) than variation supposed from the unit space.

The abnormality detection device 10 according to the present embodiment corrects the variance $\sigma_1^2$ on the basis of the percentile value which is data having a high degree of reliability in which the actual variation is reflected in this manner, and thus it is possible to further improve the accuracy of abnormality detection.

Meanwhile, in the present embodiment, an aspect in which the frequency distribution calculation unit 127 obtains the frequency distribution D1 of the values $\rho_i^2$ has been described, but there is no limitation thereto. In another embodiment, the frequency distribution calculation unit 127 may obtain a frequency distribution of values obtained by performing, for example, addition $(\rho_1^2+\rho_2^2)$, subtraction $(\rho_1^2-\rho_2^2)$, or multiplication $(\rho_1^2 \times \rho_2^2)$ on at least two of a plurality of elements included in the values $\rho_i^2$ (i= 1, 2, . . . , m). In addition, the frequency distribution calculation unit 127 may obtain a frequency distribution using the component $\rho_i$ rather than the value $\rho_i^2$.

Modification Example of Second Embodiment

In addition, the function of the frequency distribution calculation unit 127 ("frequency distribution calculation process S60") in the second embodiment may be applied to the processor 12 according to the modification example of the first embodiment.

(Functional Configuration of Abnormality Detection Device)

Figure 5:
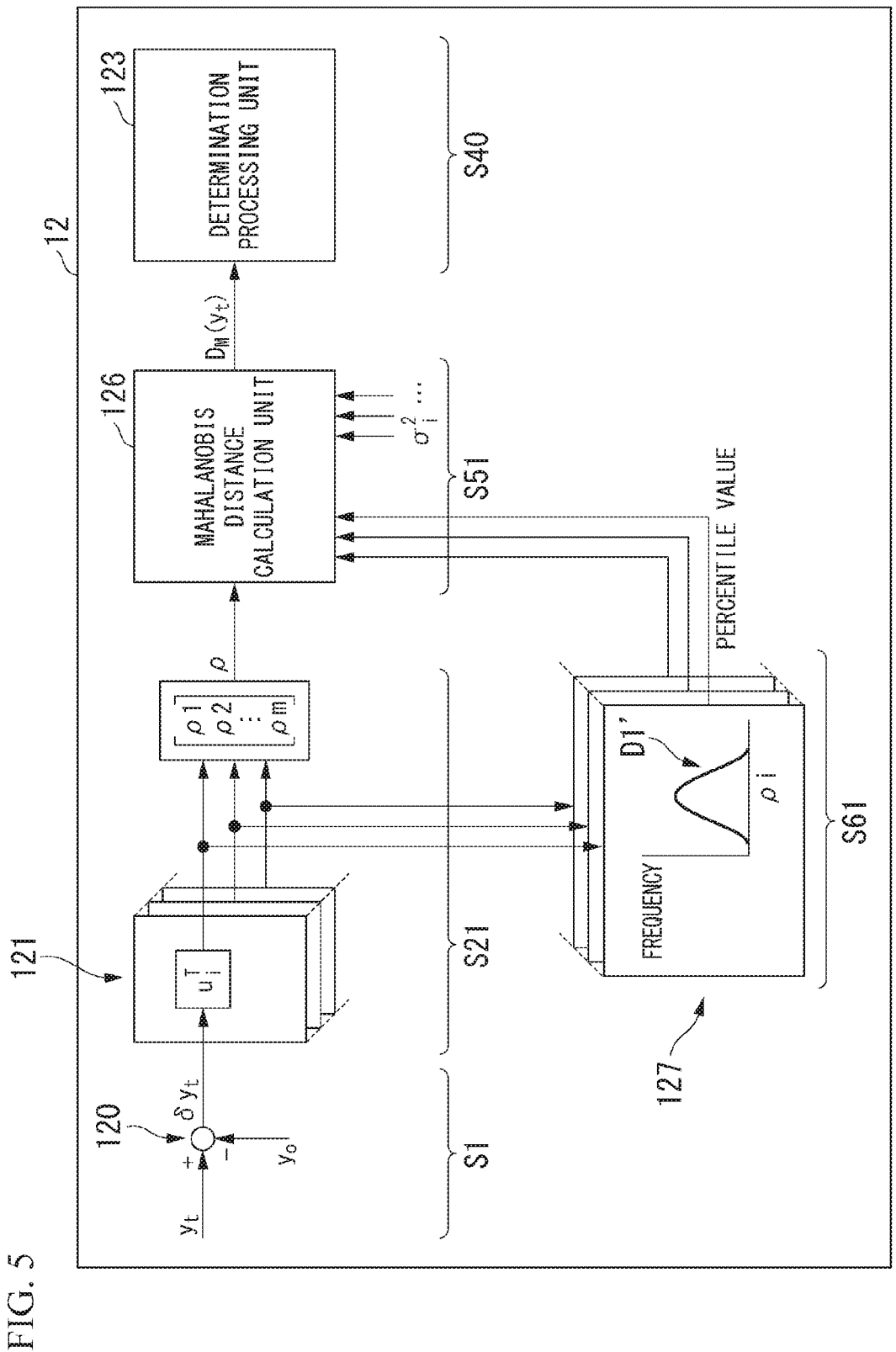
FIG. 5 is a diagram showing a functional configuration of a processor of an abnormality detection device according to a modification example of the second embodiment.

FIG. 5 is a diagram showing a functional configuration of an abnormality detection device of a processor according to a modification example of the second embodiment.

As shown in FIG. 5, the frequency distribution calculation unit 127 according to the present modification example performs a "frequency distribution calculation process S61" of obtaining a percentile value corresponding to each of the components $\rho_i$ acquired at the determination time t on the basis of a frequency distribution D1' obtained from the components $\rho_i$ into which the error vector $\delta y_t$ is decomposed with respect to the direction of the singular vector and which are accumulated in the storage unit 13.

In addition, the Mahalanobis distance calculation unit 126 corrects the correction coefficient $k_i$ with a corresponding percentile value in a "Mahalanobis distance calculation process S51", and calculates the Mahalanobis distance $D_M(y_t)$. For example, in S61, a percentile value corresponding to $\rho_i$ at time t is output. In this case, when $\rho_i$ is given to a normal distribution, the percentile value which is output in S61 is calculated. Further, the value of $\rho_i$ can also be inversely calculated so as to give the same percentile value as that output in S61 to the normal distribution. In a case where the value is denoted as $r_i$, the value of the correction coefficient $k_i$ may be set as $(\rho_i/r_i)^2$.

(Operational Effect)

As described above, in the abnormality detection device 10 according to the present modification example, the processor 12 further executes the frequency distribution calculation process S61 of obtaining a percentile value corresponding to each of the components $\rho_i$ acquired at the determination time t on the basis of the frequency distribution D1' obtained from the components $\rho_i$ into which the error vector $\delta y_t$ is decomposed with respect to the direction of the singular vector and which are accumulated in the storage unit 13, and corrects the correction coefficient $k_i$ on the basis of the percentile value in the Mahalanobis distance calculation process 551.

The abnormality detection device 10 corrects the correction coefficient $k_i$ on the basis of the percentile value which is data having a high degree of reliability in which the actual variation is reflected in this manner and then adjusts the contribution ratio of the variance $\sigma_i^2$, whereby it is possible to improve the accuracy of calculation of a Mahalanobis distance.

Third Embodiment

Next, an abnormality detection system 1 according to a third embodiment of the present invention will be described with reference to FIG. 6. Meanwhile, common components with respect to those in the embodiment and the modification example described above are denoted by the same reference numerals and signs, and thus a detailed description thereof will not be given.

(Functional Configuration of Abnormality Detection Device)

Figure 6:
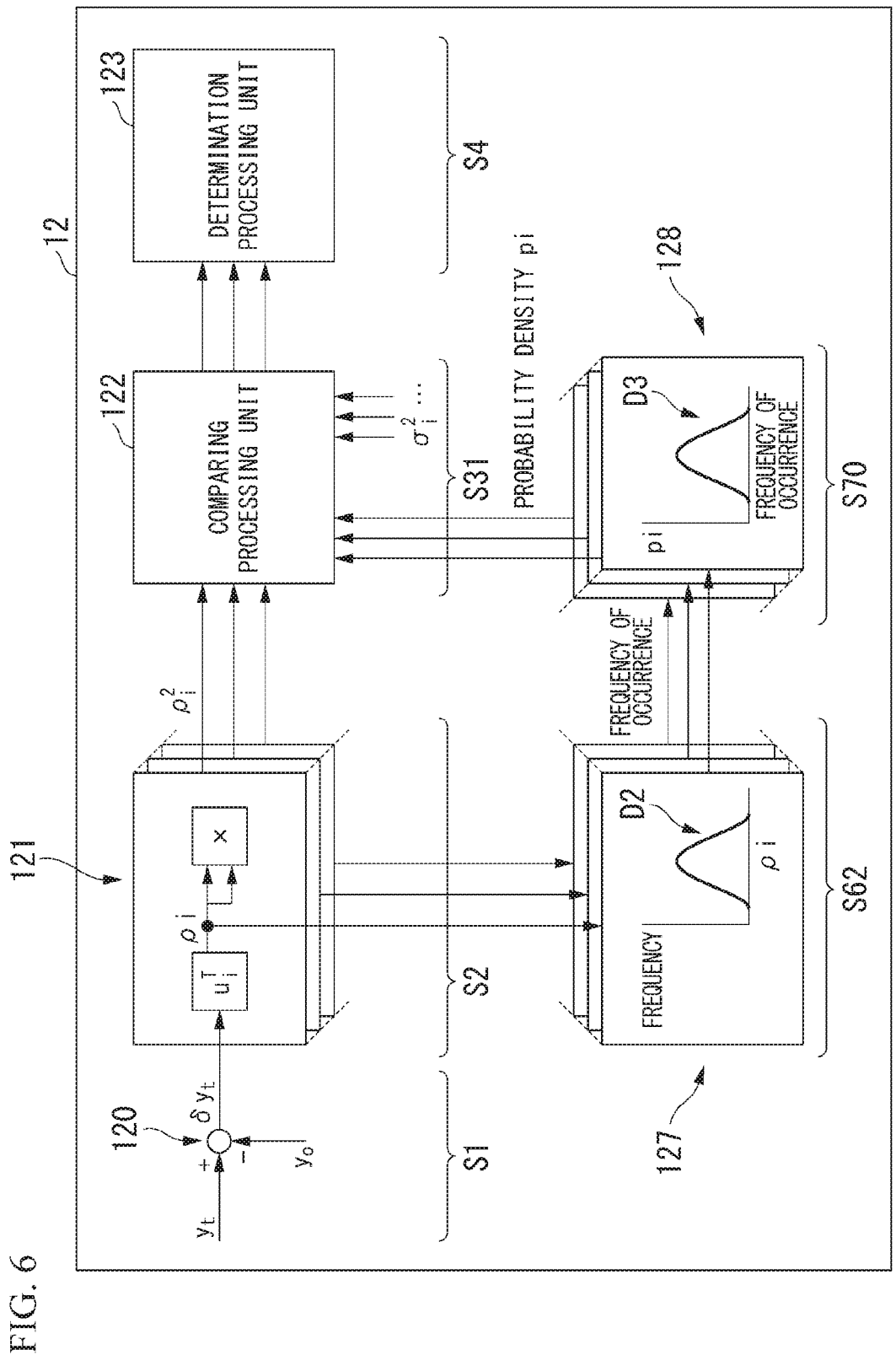
FIG. 6 is a diagram showing a functional configuration of a processor of an abnormality detection device according to a third embodiment.

FIG. 6 is a diagram showing a functional configuration of a processor of an abnormality detection device according to the third embodiment.

As shown in FIG. 6, a processor 12 of an abnormality detection device 10 according to the present embodiment includes a normalization processing unit 128 in addition to each functional unit according to the second embodiment.

The function of the error vector acquisition unit 120 ("error vector acquisition process S1"), the function of the component acquisition unit 121 ("component acquisition process S2"), and the function of the determination processing unit 123 ("determination process S4") according to the present embodiment are the same as those in the first embodiment.

The frequency distribution calculation unit 127 performs a "frequency distribution calculation process S62" of obtaining a frequency of occurrence corresponding to each of the components $\rho_i$ acquired at the determination time t on the basis of a frequency distribution D2 obtained from the components $\rho_i$ into which the error vector $\delta y_t$ is decomposed with respect to the direction of the singular vector and which are accumulated in the storage unit 13.

In addition, the frequency distribution calculation unit 127 outputs the frequency of occurrence of $\rho_i$ corresponding to each component to the normalization processing unit 128.

The normalization processing unit 128 performs a "normalization process S70" of obtaining a probability density $\rho_i$ in which the component $\rho_i$ acquired at the determination time t is observed on the basis of the frequency of occurrence of $\rho_i$ at the determination time t and a probability distribution D3 obtained by normalizing the frequency distribution D2.

Specifically, the normalization processing unit 128 first applies the frequency distribution D2 to any probability distribution among a normal distribution, a logarithmic normal distribution, a beta distribution, a gamma distribution, an exponential distribution, and the like. At this time, in a case where the frequency distribution is not applied to a single probability distribution, it may be applied to a combination of the sum, difference or the like of a plurality of probability distributions. The normalization processing unit 128 performs such application to a probability distribution, thereby allowing a probability density function regressed to a smooth curve to be obtained as shown in FIG. 6. Meanwhile, the horizontal axis in the probability distribution D3 is a frequency of occurrence, and the vertical axis is probability density $p_i$ (i=1, 2, ..., m) obtained on the basis of a probability density function.

In addition, the normalization processing unit 128 outputs the probability density $p_i$ in which the component $\rho_i$ is observed to the comparing processing unit 122 on the basis of the frequency of occurrence with respect to the component $\rho_i$ at the determination time t which is output from the frequency distribution calculation unit 127 and the probability distribution D3 with respect to the component $\rho_i$.

The comparing processing unit 122 performs a "comparing process S31" of comparing the value $\rho_i^2$ obtained by squaring each of the component $\rho_i$ into which the error vector $\delta y_t$ is decomposed with respect to the direction of the singular vector $u_i^T$ with the corresponding variance $\sigma_i^2$ in the direction of the singular vector $u_i^T$ individually with respect to the direction of the singular vector.

In this case, the comparing processing unit 122 according to the present embodiment corrects the variance σi2 on the basis of the probability density pi which is output from the normalization processing unit 128.

The content of a specific process in which the comparing processing unit 122 compares the value $\rho_i^2$ with the variance $\sigma_i^2$ after correction is the same as that in the first embodiment.

(Operational Effect)

As described above, in the abnormality detection device 10 according to the present embodiment, the processor 12 further executes the frequency distribution calculation process S62 of obtaining a frequency of occurrence corresponding to each of the components $\rho_i$ acquired at the determination time t on the basis of the frequency distribution D2 obtained from the components $\rho_i$ into which the error vector $\delta y_t$ is decomposed with respect to the direction of the singular vector and which are accumulated in the storage unit 13 and the normalization process S70 of obtaining the probability density $\rho_i$ in which the component $\rho_i$ acquired at the determination time t is observed using the probability distribution D3 obtained by normalizing the frequency distribution D2 on the basis of the frequency of occurrence, and corrects the variance $\sigma_i^2$ on the basis of the probability density $\rho_i$ in the comparing process S31.

As described above, in a case where the number of samples accumulated in the storage unit 13 of the abnormality detection device 10 is greater than the number of samples in the unit space, the statistical reliability of the samples accumulated in the storage unit 13 becomes higher. Therefore, by using the probability density $\rho_i$ obtained with reference to the probability distribution D3 based on the components $\rho_i$ accumulated in the storage unit 13 as described above, statistical reliability can be further enhanced than in a case where only the Mahalanobis distance is used as a reference for determination. As a result, the abnormality detection device 10 can further improve the accuracy of abnormality detection.

Meanwhile, in the present embodiment, an aspect in which the comparing processing unit 122 corrects the variance $\sigma_i^2$ on the basis of a probability density has been described, but there is no limitation thereto. In another embodiment, the comparing processing unit 122 may perform, for example, the following comparing process.

The comparing processing unit 122 first assumes the elements of ρi (i=1, 2, ..., m) observed at the determination time t to be independent of each other due to these elements being uncorrelated with each other, and approximates a probability density p in which $\rho_i$ is observed by "p (p$_1$, p$_2$, ..., p$_m$)=p$_1$×p$_2$× ... ×p$_m$" to obtain the probability density.

The value of this probability density p (p$_1$, p$_2$, ..., p$_m$) is proportional to a probability in which ρi (i=1, 2, ..., m) is observed at a certain time, therefore, the comparing processing unit 122 may output a compared result indicating whether a value obtained by subtracting a probability density p' (p'$_1$, p'$_2$, ..., p'$_m$) at another time (for example, time t−1) from a probability density p (p$_1$, p$_2$, ..., p$_m$) at the determination time t is equal to or greater than a predetermined allowable value to the determination processing unit 123. In this case, the determination processing unit 123 determines that the state of the target device 2 is abnormal in a case where the compared result indicating that the above value is equal to or greater than the predetermined allowable value is a predetermined upper-limit number (any value equal to or greater than 1).

Modification Example of Third Embodiment

In addition, the function of the normalization processing unit 128 ("normalization process S70") in the third embodiment may be applied to the processor 12 according to the modification example of the second embodiment.

(Functional Configuration of Abnormality Detection Device)

Figure 7:
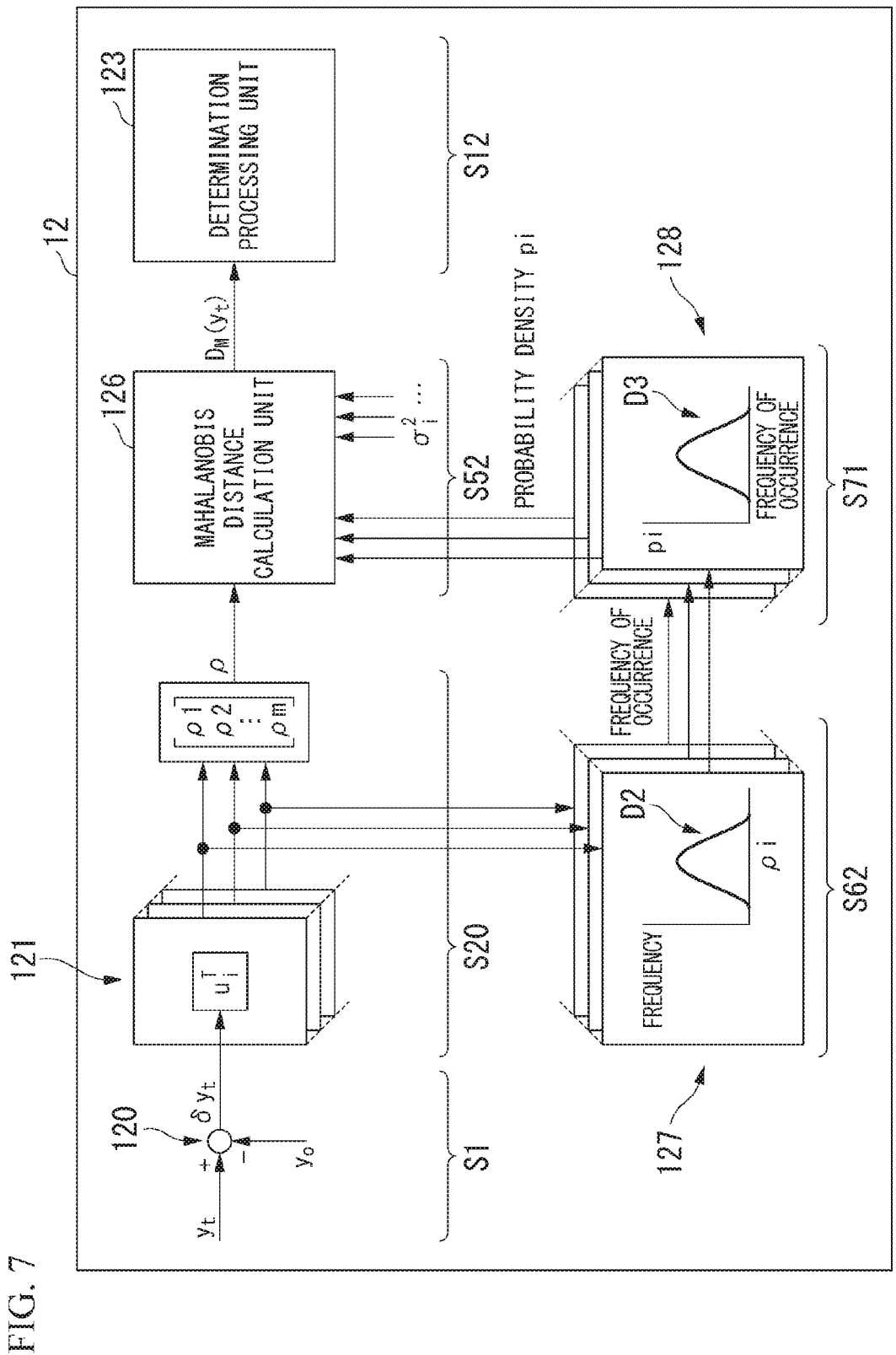
FIG. 7 is a diagram showing a functional configuration of a processor of an abnormality detection device according to a modification example of the third embodiment.

FIG. 7 is a diagram showing a functional configuration of a processor of an abnormality detection device according to a modification example of the third embodiment.

As shown in FIG. 7, the normalization processing unit 128 according to the present modification example performs a "normalization process S71" of outputting a probability density $\rho_i$ in which the component $\rho_i$ is observed to the Mahalanobis distance calculation unit 126 on the basis of the probability distribution D3 with respect to the component $\rho_i$ and the frequency of occurrence with respect to the component $\rho_i$ at the determination time t which is output from the frequency distribution calculation unit 127.

In addition, the Mahalanobis distance calculation unit 126 corrects the correction coefficient $k_i$ with the corresponding probability density $\rho_i$ in the "Mahalanobis distance calculation process S52", and calculates the Mahalanobis distance $D_M(y_t)$.

(Operational Effect)

As described above, in the abnormality detection device 10 according to the present modification example, the processor 12 further executes the frequency distribution calculation process S62 of obtaining a frequency of occurrence corresponding to each of the components $\rho_i$ acquired at the determination time t on the basis of the frequency distribution D2 obtained from the components $\rho_i$ into which the error vector $\delta y_t$ is decomposed with respect to the direction of the singular vector and which are accumulated in the storage unit 13 and the normalization process S71 of obtaining the probability density $p_i$ in which the component $\rho_i$ acquired at the determination time t is observed using a probability distribution obtained by normalizing the frequency distribution D2, and corrects the correction coefficient $k_i$ on the basis of the probability density $p_i$ in the Mahalanobis distance calculation process S52.

In this manner, the abnormality detection device 10 uses the probability density $p_i$ in which the component $\rho_i$ at the determination time t is observed from the probability distribution D3 based on the components $\rho_i$ accumulated in the storage unit 13, and thus can further enhance statistical reliability than in a case where only the Mahalanobis distance is used as a reference for determination. As a result, the abnormality detection device 10 can further improve the accuracy of calculation of a Mahalanobis distance.

Fourth Embodiment

Next, an abnormality detection system 1 according to a fourth embodiment of the present invention will be described with reference to FIG. 8. Meanwhile, common components with respect to those in the embodiment and the modification example described above are denoted by the same reference numerals and signs, and thus a detailed description thereof will not be given.

In the present embodiment, the functions of the error vector acquisition unit 120 and the component acquisition unit 121 are different from those in the first embodiment.

(Functional Configuration of Abnormality Detection Device)

Figure 8:
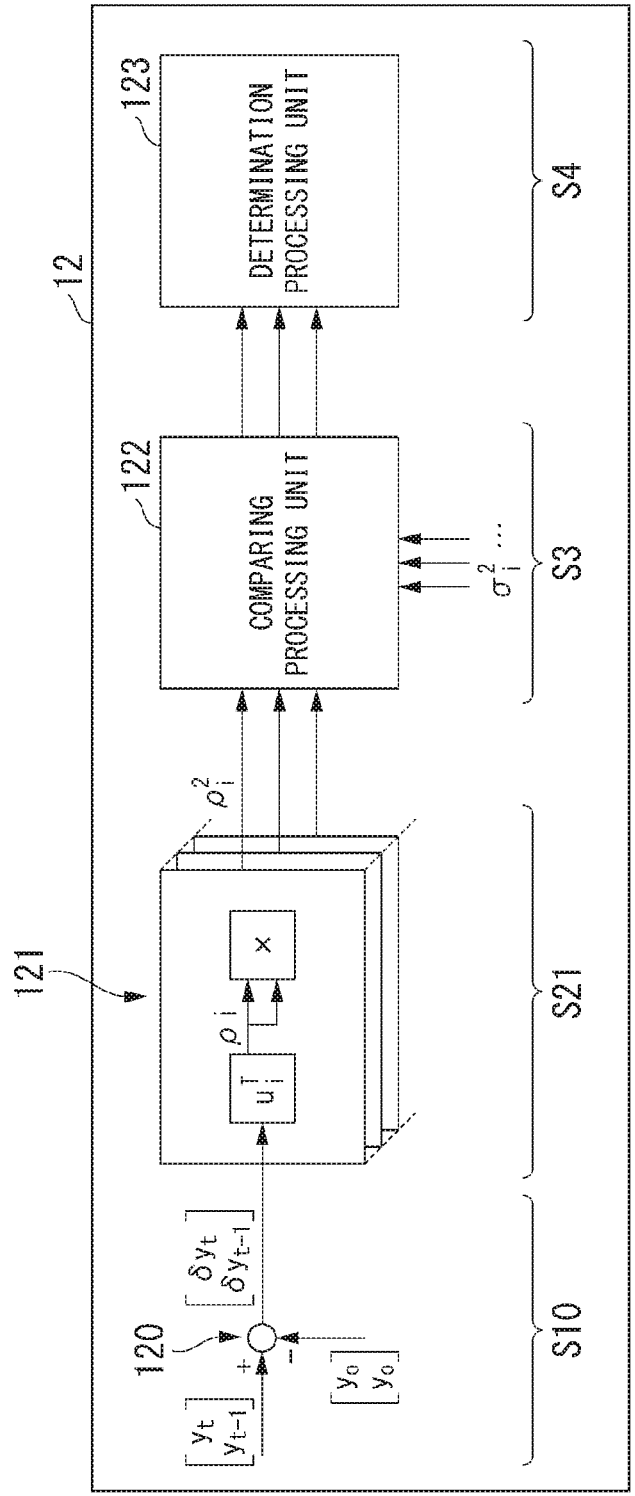
FIG. 8 is a diagram showing a functional configuration of a processor of an abnormality detection device according to a fourth embodiment.

FIG. 8 is a diagram showing a functional configuration of a processor of an abnormality detection device according to the fourth embodiment.

As shown in FIG. 8, the error vector acquisition unit 120 according to the present embodiment performs an "error vector acquisition process S10" of acquiring an error vector of a measurement value vector having measurement values measured at a plurality of times as elements.

For example, as shown in FIG. 8, the error vector acquisition unit 120 acquires an error vector using the following Expression (8) with respect to a measurement value vector including a first measurement value vector $y_t$ having measurement values measured at the determination time t as elements and a second measurement value vector $y_{t-1}$ having measurement values measured at time t−1 before one step of determination time t as elements.

$$\begin{bmatrix} \delta y_t \\ \delta y_{t-1} \end{bmatrix} = \begin{bmatrix} y_t \\ y_{t-1} \end{bmatrix} - \begin{bmatrix} y_0 \\ y_0 \end{bmatrix} \qquad (8)$$

In a case where the first measurement value vector $y_t$ and the second measurement value vector $y_{t-1}$ are assumed to include measurement values for m kinds of items as elements, the error vector acquisition unit 120 acquires an error vector including 2m elements with respect to a measurement value vector including 2m elements.

Meanwhile, the second measurement value vector may be a measurement value vector $y_{t-2}$ before two steps (time t−2) without being limited to a vector before one step of determination time t, or may be a measurement value vector at an earlier time.

In addition, the second measurement value vector may include a plurality of measurement value vectors. In this case, the second measurement value vector may include a plurality of measurement value vectors (for example, measurement value vectors $y_{t-1}$, $y_{t-2}$, and $y_{t-3}$ at time t−1, time t−2, and time t−3) adjacent to each other in a time-series manner, or may include a plurality of measurement value vectors (for example, measurement value vectors $y_{t-1}$, $y_{t-4}$, and $y_{t-8}$ at time t−1, time t−4, and time t−8) which are discontinuous in a time-series manner.

The component acquisition unit 121 performs a "component acquisition process S21" of acquiring a plurality of components $\rho_i$ into which the error vector is decomposed with respect to the direction of the singular vector similarly to the first embodiment. In the example of FIG. 8, the component ρi (i=1, 2, . . . , 2m) into which the error vector δy$_t$ is decomposed with respect to the direction of the singular value vector is acquired using the following Expression (9).

$$\rho_i = u_i^T \begin{bmatrix} \delta y_t \\ \delta y_{t-1} \end{bmatrix} \quad (9)$$

The function of the comparing processing unit 122 ("comparing process S3") and the function of the determination processing unit 123 ("determination process S4") are the same as those in the first embodiment.

(Operational Effect)

As described above, in the abnormality detection device 10 according to the present embodiment, the measurement value vector includes the first measurement value vector yt having measurement values measured at the determination time t as elements and the second measurement value vector yt−1 having measurement values measured before determination time t (for example, at time t−1) as elements.

In a dynamic system in which output to input is not instantaneous (exhibits late response), there may be a dependent relationship between the measurement value at the determination time t and the measurement value at the past time (for example, time t−1). Therefore, in a case where an abnormality determination is performed on the basis of only the measurement value at the determination time t, this dependent relationship is not able to be considered, and thus there is the possibility of the accuracy of abnormality detection decreasing due to the occurrence of a calculation error.

In addition, in a technique using the MT method of the related art, as the number of elements of the measurement value vector increases, the possibility of division by zero increases and thus it becomes difficult to calculate an inverse matrix. For this reason, it is not possible to perform abnormality detection to which a dependent relationship between measurement values at a plurality of times is added.

However, the abnormality detection device 10 according to the present embodiment performs abnormality detection on the basis of the result of comparing of the value $\rho_i^2$ obtained by squaring each of the component $\rho_i$ with the variance $\sigma_i^2$, and thus the deterioration of the accuracy of calculation due to division by zero does not occur even in a case where the number of elements increases. In addition, since the abnormality detection device 10 performs an abnormality determination on the basis of the measurement value vectors (the first measurement value vector and the second measurement value vector) at a plurality of times, it is possible to reduce a calculation error resulting from the property of a dynamic system, and to further improve the accuracy of abnormality detection.

Fifth Embodiment

Next, an abnormality detection system 1 according to a fifth embodiment of the present invention will be described with reference to FIG. 9. Meanwhile, common components with respect to those in the embodiment and the modification example described above are denoted by the same reference numerals and signs, and thus a detailed description thereof will not be given.

In the present embodiment, the functions of the error vector acquisition unit 120 and the component acquisition unit 121 are different from those in the fourth embodiment.

(Functional Configuration of Abnormality Detection Device)

Figure 9:
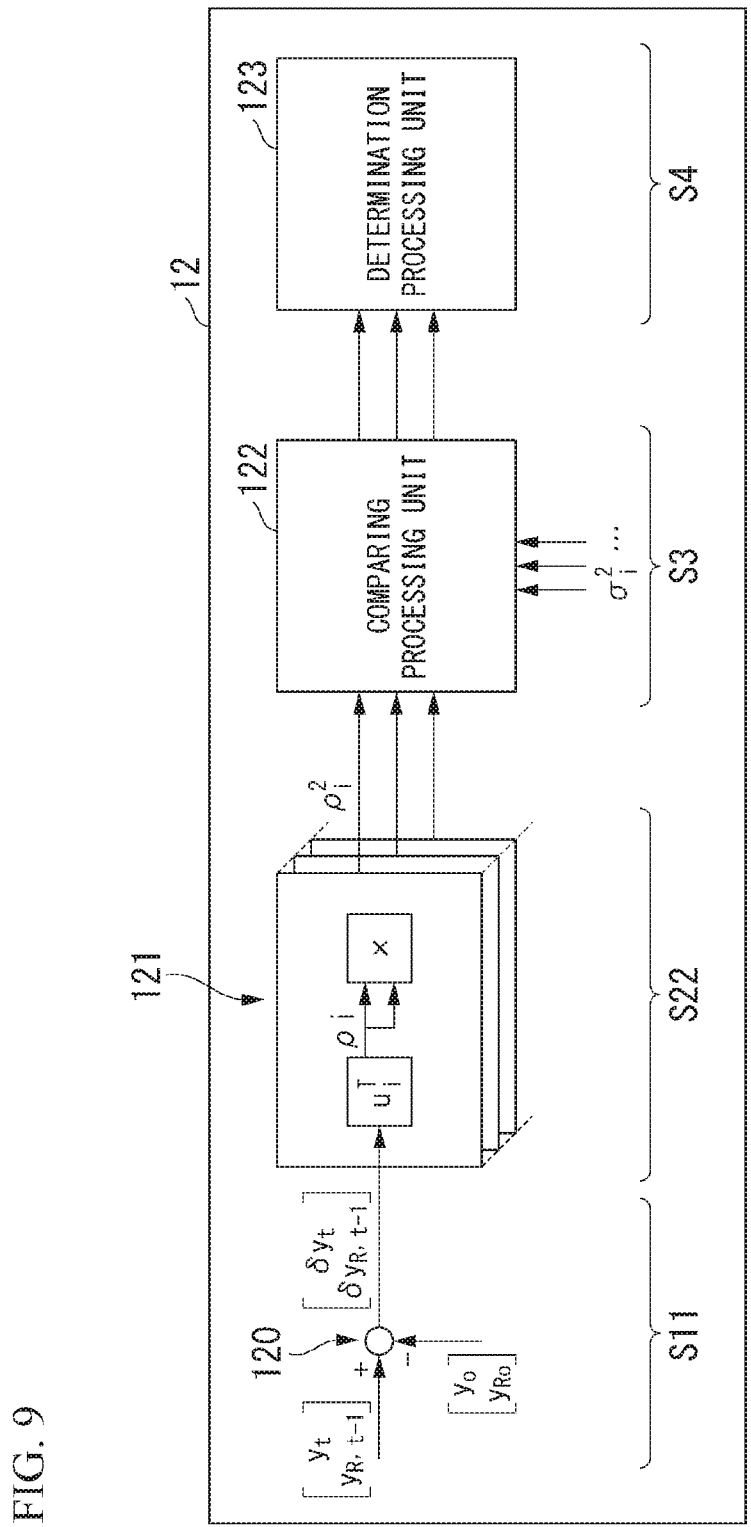
FIG. 9 is a diagram showing a functional configuration of a processor of an abnormality detection device according to a fifth embodiment.

FIG. 9 is a diagram showing a functional configuration of a processor of an abnormality detection device according to the fifth embodiment.

As shown in FIG. 9, the error vector acquisition unit 120 according to the present embodiment performs an "error vector acquisition process S11" of acquiring an error vector of a measurement value vector having measurement values measured at a plurality of times as elements.

For example, the error vector acquisition unit 120 acquires an error vector using the following Expression (10) with respect to a measurement value vector including a first measurement value vector y$_t$ having measurement values measured at the determination time t as elements and a second measurement value vector y$_{R, t-1}$ having a predetermined number of measurement values among measurement values measured at time t−1 before one step of the determination time t as elements as shown in FIG. 9.

$$\begin{bmatrix} \delta y_t \\ \delta y_{R,t-1} \end{bmatrix} = \begin{bmatrix} y_t \\ y_{R,t-1} \end{bmatrix} - \begin{bmatrix} y_0 \\ y_{R0} \end{bmatrix} \quad (10)$$

In the present embodiment, the number mR of elements of the second measurement value vector y$_{R, t-1}$ is set to be smaller than the number m of elements of the first measurement value vector y$_t$. For example, the number mR of elements of the second measurement value vector y$_{R, t-1}$ is set to one half (m/2) of the number m of elements of the first measurement value vector y$_t$.

Therefore, the error vector acquisition unit 120 acquires an error vector including m+mR elements with respect to a measurement value vector including m+mR elements.

Meanwhile, measurement values featuring the state of the target device 2 are selected as elements of the second measurement value vector y$_{R,t-1}$. In a case where the target device 2 is a device constituting a power generation plant, for example, measurement values relevant to electric output, electric output command values, or the like are selected. In addition, in a case where the target device 2 is a vehicle such as an automobile, measurement values relevant to speed, speed commands, or the like are selected.

In addition, the second measurement value vector may be a measurement value vector y$_{R, t-2}$ before two steps (time t−2) without being limited to a vector before one step of determination time t, or may be a measurement value vector at an earlier time. Further, the second measurement value vector may include a plurality of measurement value vectors. In this case, the second measurement value vector may include a plurality of measurement value vectors (for example, measurement value vectors y$_{R, t-1}$, y$_{R, t-2}$, and y$_{R,t-3}$ at time t−1, time t−2, and time t−3) which are adjacent to each other in a time-series manner, or may include a plurality of measurement value vectors (for example, measurement value vectors y$_{R, t-1}$, y$_{R, t-4}$, and y$_{R, t-5}$ at time t−1, time t−4, and time t−8) which are discontinuous in a time-series manner.

Similarly to the fourth embodiment, the component acquisition unit 121 performs a "component acquisition process S22" of acquiring components $\rho_i$ into which the error vector is decomposed with respect to the direction of the singular vector. In the example of FIG. 9, the component ρi (i=1, 2, ..., mR) into which the error vector δy$_t$ is decomposed with respect to the direction of the singular vector is acquired using the following Expression (11).

$$\rho_i = u_i^T \begin{bmatrix} \delta y_t \\ \delta y_{R,t-1} \end{bmatrix} \quad (11)$$

The function of the comparing processing unit 122 ("comparing process S3") and the function of the determination processing unit 123 ("determination process S4") are the same as those in the first embodiment.

(Operational Effect)

As described above, in the abnormality detection device 10 according to the present embodiment, the second measurement value vector has fewer kinds of measurement values than the first measurement value vector y$_t$ as elements.

In this manner, the abnormality detection device 10 can suppress an increase in the amount of calculation due to the addition of the second measurement value vector at the past time.

Sixth Embodiment

Next, an abnormality detection system 1 according to a sixth embodiment of the present invention will be described with reference to FIG. 10. Meanwhile, common components with respect to those in the embodiment and the modification example described above are denoted by the same reference numerals and signs, and thus a detailed description thereof will not be given.

The target device 2 according to the present embodiment is a device group in which a plurality of devices of the same type are arranged in parallel with each other. For example, a device group operating simultaneously and in parallel serves as the target device 2 like a windmill group used in wind power generation.

In addition, in the present embodiment, the functions of the error vector acquisition unit 120 and the component acquisition unit 121 are different from those in the first embodiment.

(Functional Configuration of Abnormality Detection Device)

Figure 10:
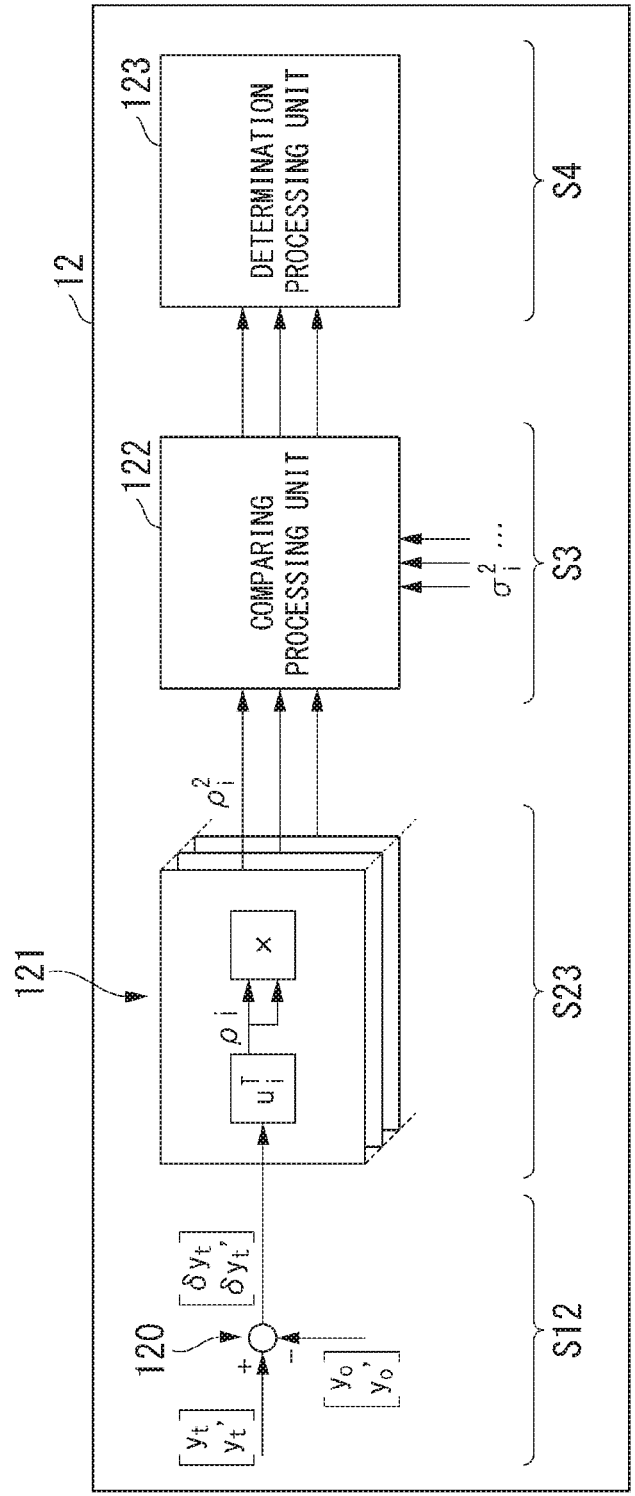
FIG. 10 is a diagram showing a functional configuration of a processor of an abnormality detection device according to a sixth embodiment.

FIG. 10 is a diagram showing a functional configuration of a processor of an abnormality detection device according to the sixth embodiment.

As shown in FIG. 10, the error vector acquisition unit 120 according to the present embodiment performs an "error vector acquisition process S12" of acquiring an error vector of a measurement value vector of each of a plurality of target devices 2 at the determination time t.

For example, in a case where the target device 2 is configured of two windmills (a first windmill and a second windmill), the error vector acquisition unit 120 acquires a measurement value vector y$_t$ from the first windmill, and acquires a measurement value vector y$_t$' from the second windmill. The error vector acquisition unit 120 acquires an error vector using the following Expression (12).

$$\begin{bmatrix} \delta y_t \\ \delta y_t' \end{bmatrix} = \begin{bmatrix} y_t \\ y_t' \end{bmatrix} - \begin{bmatrix} y_0 \\ y_0' \end{bmatrix} \quad (12)$$

An average value vector y$_0$ has the average value of measurement values of the first windmill accumulated in the storage unit 13 as an element. An average value vector y$_0$' has the average value of measurement values of the second windmill accumulated in the storage unit 13 as an element.

In addition, the numbers of elements of the measurement value vectors y$_t$ and y$_t$' are each assumed to be m.

The component acquisition unit 121 performs a "component acquisition process S23" of acquiring components ρ$_i$ into which the error vector is decomposed with respect to the direction of the singular vector similarly to the first embodiment. In the example of FIG. 10, the component ρi (i=1, 2, ..., m+m) into which the error vector δy$_t$ is decomposed with respect to the direction of the singular vector is acquired using the following Expression (13).

$$\rho_i = u_i^T \begin{bmatrix} \delta y_t \\ \delta y_t' \end{bmatrix} \quad (13)$$

The function of the comparing processing unit 122 ("comparing process S3") and the function of the determination processing unit 123 ("determination process S4") are the same as those in the first embodiment.

(Operational Effect)

As described above, in the abnormality detection device 10 according to the present embodiment, the target device 2 is configured of a plurality of identical devices. In addition, in the error vector acquisition process S12, the processor 12 acquires, as error vectors δy$_t$ and δy$_t$', vectors representing differences between measurement value vectors y$_t$ and y$_t$' with respect to the target device having measurement values measured in each of the plurality of target devices 2 as elements and average value vectors y$_0$ and y$_0$' with respect to the target device accumulated in the storage unit 13.

In this manner, the abnormality detection device 10 can determine the presence or absence of an abnormality on the basis of a difference between one target device 2 (for example, the first windmill) and another target device 2 (for example, the second windmill) among the plurality of target devices 2 which are simultaneously operated. Thereby, the abnormality detection device 10 can further improve the accuracy of abnormality detection.

Meanwhile, FIG. 10 shows an example in which the target device 2 is configured of two devices (windmills), but there is no limitation thereto. The target device 2 may be configured of three or more devices.

For example, in a case where the target device 2 is configured of one hundred windmills, these windmills are operated in the state of having statistical variation. At this time, in a case where, at the determination time t, ninety-nine windmills are in a range of variation, but only one windmill falls outside a range of variation, the abnormality detection device 10 can determine that the state of this one windmill is abnormal.

Figure 12:
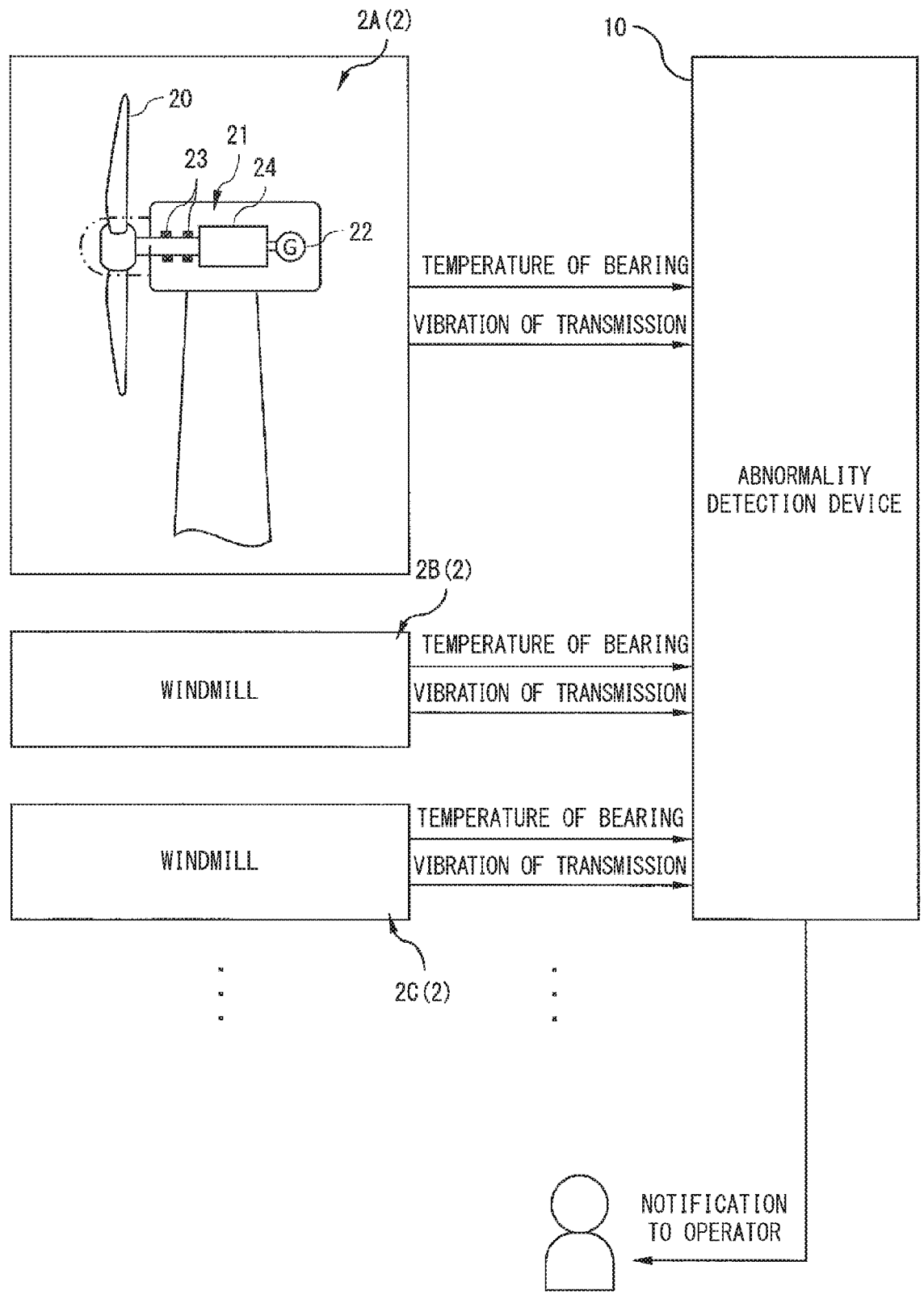
FIG. 12 is a diagram showing an application example of the abnormality detection device according to the sixth embodiment.

FIG. 12 is a diagram showing an application example of the abnormality detection device according to the sixth embodiment.

Specifically, as shown in FIG. 12, a plurality of windmills 2A, 2B, 2C, ... are provided as the target device 2. Meanwhile, in the following description, the windmills 2A, 2B, 2C, ... are also referred to as the windmill 2 collectively. The windmill 2 transmits the rotational force of a windmill blade 20 to a generator 22 through a drive train 21, and converts wind force into electric power. The health of the drive train 21 which is a movable portion is important to the operation of the windmill 2, and the temperature of a main bearing 23 constituting the drive train 21, the vibration of a transmission 24, or the like is monitored. For example, the abnormality detection device 10 accepts input of signals (measurement values) such as the temperatures of the bearings 23 or the vibrations of the transmissions 24 from one hundred windmills 2 provided adjacent to each other, and determines whether there are windmills falling outside a range of normal variation among the one hundred windmills 2. In a case where it is determined that at least one windmill 2 falls outside a range of normal variation, the abnormality detection device 10 notifies an operator that there is the possibility of the occurrence of abnormality. Meanwhile, the abnormality detection device 10 may let the operator know the possibility of the occurrence of abnormality through the control device 3 by notifying the control device 3 of this notification. In this manner, the abnormality detection device 10 according to the present embodiment can detect a symptom of abnormality earlier by comparison between a plurality of windmills 2 provided adjacent to each other. In addition, since a notification to the operator is automatically performed, the load of work such as monitoring or confirmation performed by the operator is also reduced.

In addition, FIG. 10 shows an example in which the numbers of elements of the measurement value vectors $y_t$ and $y_t'$ of each of the plurality of target devices 2 are the same (m) as each other, but there is no limitation thereto. The measurement value vector may have a different number of elements with respect to the target device. In addition, the measurement value vectors $y_t$ and $y_t'$ may have different kinds of measurement values as elements with respect to the target device.

(Hardware Configuration of Abnormality Detection Device)

Figure 11:
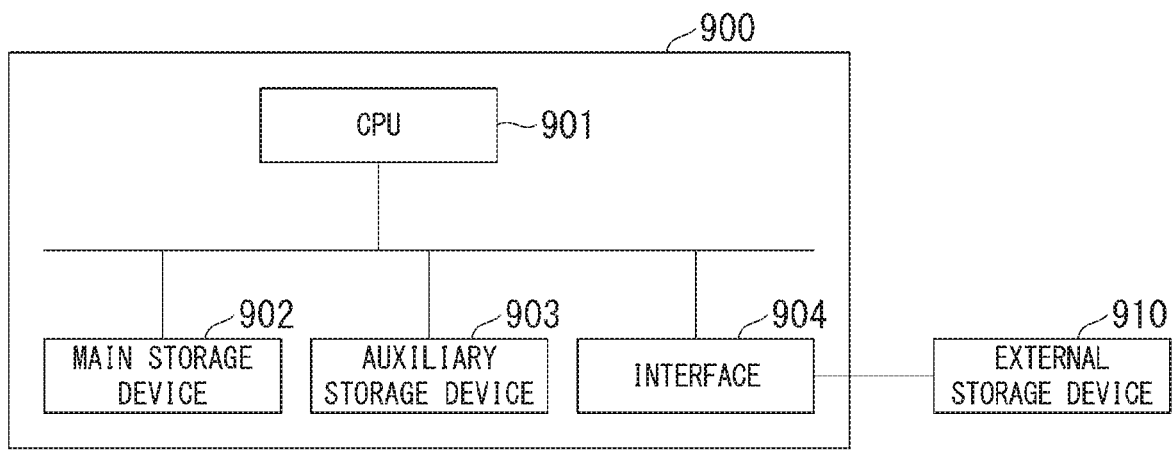
FIG. 11 is a diagram showing an example of a configuration of hardware of an abnormality detection device according to at least one embodiment.

FIG. 11 is a diagram showing an example of a configuration of hardware of the abnormality detection device according to at least one embodiment.

Hereinafter, an example of the hardware configuration of the abnormality detection device 10 will be described with reference to FIG. 11.

As shown in FIG. 11, a computer 900 includes a CPU 901, a main storage device 902, an auxiliary storage device 903, and an interface 904.

The above-described abnormality detection device 10 is mounted in the computer 900. The operation of each processing unit described above is stored in the auxiliary storage device 903 in the format of a program. The CPU 901 (processor 12) reads out a program from the auxiliary storage device 903 to develop the read-out program into the main storage device 902, and executes the above process in accordance with the program. In addition, the CPU 901 secures a storage area used in various processes by the abnormality detection device 10 in the main storage device 902 in accordance with the program. In addition, the CPU 901 secures a storage area (storage unit 13) for storing data during processing in the auxiliary storage device 903 in accordance with the program.

An example of the auxiliary storage device 903 includes a hard disk drive (HDD), a solid state drive (SSD), a magnetic disc, a magnetooptic disc, a compact disc read only memory (CD-ROM), a digital versatile disc read only memory (DVD-ROM), a semiconductor memory, or the like. The auxiliary storage device 903 may be internal media connected directly to the bus of the computer 900, or may be external media connected to the computer 900 through the interface 904 or a communication line. In addition, in a case where this program is delivered to the computer 900 through a communication line, the computer 900 having accepted the delivery may develop the program into the main storage device 902, and execute the above process. In at least one embodiment, the auxiliary storage device 903 is a non-transitory tangible storage medium.

In addition, the program may be a program which is used for realizing a portion of the aforementioned functions. Further, the program may be a so-called difference file (difference program) for realizing the aforementioned functions by a combination with another program stored in advance in the auxiliary storage device 903.

While preferred embodiments of the invention have been described and shown above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An abnormality detection device that is configured to detect presence or absence of an abnormality in a target device, the abnormality detection device comprising:
   a processor;
   a transceiver that receives, from the target device, measurement values related to the target device, wherein the measurement values are measured by the target device at a determination time;
   a storage unit connected to the processor and the transceiver and that stores:
      the measurement values; and
      accumulated measurement values in which the measurement values have been accumulated; and
   a bus that connects the processor, the storage unit, and the transceiver, wherein
   the processor is configured to execute:
      an error vector acquisition process of acquiring an error vector representing a difference between a measurement value vector having the measurement values measured at the determination time as elements and an average value vector having an average value of the accumulated measurement values as an element;
      a component acquisition process of acquiring a plurality of components into which the error vector is decomposed with respect to a direction of a singular vector;
      a comparing process of comparing a value obtained by squaring each of the components into which the error vector is decomposed with respect to the direction of the singular vector with corresponding variance in the direction of the singular vector individually with respect to the direction of the singular vector; and
      a determination process of determining the presence or absence of an abnormality on the basis of a plurality of compared results in the comparing process, and
   upon determining the presence of the abnormality, the processor causes the transceiver to transmit, to a control device that controls the target device, a notification indicating the presence of abnormality.

2. The abnormality detection device according to claim 1, wherein,
   in the comparing process, the processor is configured to output the compared result indicating whether a difference between a value obtained by squaring each of the component into which the error vector is decomposed with respect to the direction of the singular vector and corresponding variance in the direction of the singular vector is equal to or greater than a predetermined threshold, and in the determination process, the processor is configured to determine an abnormality in a case where the number of compared results indicating that the difference is equal to or greater than the threshold is equal to or greater a predetermined upper-limit number.

3. The abnormality detection device according to claim 1, wherein the processor is further configured to execute a frequency distribution calculation process of obtaining a percentile value corresponding to each of the components acquired at the determination time on the basis of a frequency distribution obtained from components into which the error vector is decomposed with respect to the direction of the singular vector and which are accumulated in the storage unit, and in the comparing process, the processor is configured to correct the variance on the basis of the percentile value.

4. The abnormality detection device according to claim 1, wherein the processor is further configured to execute a frequency distribution calculation process of obtaining a frequency of occurrence corresponding to each of the components acquired at the determination time on the basis of a frequency distribution obtained from components into which the error vector is decomposed with respect to the direction of the singular vector and which are accumulated in the storage unit, and a normalization process of obtaining a probability density in which the component acquired at the determination time is observed on the basis of the frequency of occurrence and a probability distribution obtained by normalizing the frequency distribution, and in the comparing process, the processor is configured to correct the variance on the basis of the probability density.

5. The abnormality detection device according to claim 1, wherein the measurement value vector includes a first measurement value vector having the measurement values measured at the determination time as elements and a second measurement value vector having measurement values measured before the determination time as elements.

6. The abnormality detection device according to claim 5, wherein the second measurement value vector has fewer kinds of measurement values than the first measurement value vector as elements.

7. The abnormality detection device according to claim 1, wherein the target device is configured of a plurality of devices of the same type, and in the error vector acquisition process, the processor is configured to acquire, as the error vector, a vector representing a difference between a measurement value vector with respect to the target device having measurement values measured in each of a plurality of the target devices as elements and an average value vector with respect to the target device accumulated in the storage unit.

8. An abnormality detection device that is configured to detect presence or absence of an abnormality in a target device, the abnormality detection device comprising:

a processor;

a transceiver that receives, from the target device, measurement values related to the target device, wherein the measurement values are measured by the target device at a determination time;

a storage unit connected to the processor and the transceiver and that stores:

the measurement values; and accumulated measurement values in which the measurement values have been accumulated; and a bus that connects the processor, the storage unit, and the transceiver, wherein the processor is configured to execute:

an error vector acquisition process of acquiring an error vector representing a difference between a measurement value vector having the measurement values measured at the determination time as elements and an average value vector having an average value of the accumulated measurement values as an element;

a component acquisition process of acquiring a component vector having components into which the error vector is decomposed with respect to a direction of a singular vector as elements;

a Mahalanobis distance calculation process of calculating a Mahalanobis distance on the basis of the component vector, variance in the direction of the singular vector, and a correction coefficient with respect to the direction of the singular vector; and a determination process of determining the presence or absence of an abnormality on the basis of the Mahalanobis distance, and upon determining the presence of the abnormality, the processor causes the transceiver to transmit, to a control device that controls the target device, a notification indicating the presence of abnormality.

9. The abnormality detection device according to claim 8, wherein the processor is further configured to execute a frequency distribution calculation process of obtaining a percentile value corresponding to each of the components acquired at the determination time on the basis of a frequency distribution obtained from components into which the error vector is decomposed with respect to the direction of the singular vector and which are accumulated in the storage unit, and in the Mahalanobis distance calculation process, the processor is configured to correct the correction coefficient on the basis of the percentile value.

10. The abnormality detection device according to claim 8, wherein the processor is further configured to execute a frequency distribution calculation process of obtaining a frequency of occurrence corresponding to each of the components acquired at the determination time on the basis of a frequency distribution obtained from components into which the error vector is decomposed with respect to the direction of the singular vector and which are accumulated in the storage unit, and a normalization process of obtaining a probability density in which the component acquired at the determination time is observed on the basis of the frequency of occurrence and a probability distribution obtained by normalizing the frequency distribution, and in the Mahalanobis distance calculation process, the processor is configured to correct the correction coefficient on the basis of the probability density.

11. An abnormality detection method comprising:

receiving, with a transceiver of a computer, from a target device, measurement values related to the target device, wherein the measurement values are measured by the target device at a determination time;

storing, in a storage of the computer, the measurement values;

storing, in the storage, accumulated measurement values in which the measurement values have been accumulated;
acquiring, with a processor of the computer, an error vector representing a difference between a measurement value vector having the measurement values measured at the determination time as elements and an average value vector having an average value of the accumulated measurement values as an element;
acquiring, with the processor, a plurality of components into which the error vector is decomposed with respect to a direction of a singular vector;
comparing, with the processor, a value obtained by squaring each of the components into which the error vector is decomposed with respect to the direction of the singular vector with corresponding variance in the direction of the singular vector individually with respect to the direction of the singular vector;
determining presence or absence of an abnormality on the basis of a plurality of compared results; and
upon determining the presence of the abnormality, transmitting, from the transceiver to a control device that controls the target device, a notification indicating the presence of abnormality.

12. An abnormality detection method comprising:
receiving, with a transceiver of a computer, from a target device, measurement values related to the target device, wherein the measurement values are measured by the target device at a determination time;
storing, in a storage of the computer, the measurement values;
storing, in the storage, accumulated measurement values in which the measurement values have been accumulated;
acquiring, with a processor of the computer, an error vector representing a difference between a measurement value vector having the measurement values measured at the determination time as elements and an average value vector having an average value of the accumulated measurement values as an element;
acquiring, with the processor, a component vector having components into which the error vector is decomposed with respect to a direction of a singular vector as elements;
calculating, with the processor, a Mahalanobis distance on the basis of the component vector, variance in the direction of the singular vector, and a correction coefficient with respect to the direction of the singular vector;
determining, with the processor, presence or absence of an abnormality on the basis of the Mahalanobis distance; and
upon determining the presence of the abnormality, transmitting, from the transceiver to a control device that controls the target device, a notification indicating the presence of abnormality.

13. A non-transitory computer readable medium storing a program for causing a computer of an abnormality detection device including a processor, a transceiver, and a storage unit connected to the processor and the transceiver to function, the program causing the processor to:
cause the transceiver to receive, from a target device, measurement values related to the target device, wherein the measurement values are measured by the target device at a determination time;
cause the storage unit to store the measurement values;
cause the storage unit to store accumulated measurement values in which the measurement values have been accumulated;
acquire an error vector representing a difference between a measurement value vector having the measurement values measured at the determination time as elements and an average value vector having an average value of the accumulated measurement values as an element;
acquire a plurality of components into which the error vector is decomposed with respect to a direction of a singular vector;
compare a value obtained by squaring each of the components into which the error vector is decomposed with respect to the direction of the singular vector with corresponding variance in the direction of the singular vector individually with respect to the direction of the singular vector;
determine presence or absence of an abnormality on the basis of a plurality of compared results; and
upon determining the presence of the abnormality, cause the transceiver to transmit, to a control device that controls the target device, a notification indicating the presence of abnormality.

14. A non-transitory computer readable medium storing a program for causing a computer of an abnormality detection device including a processor, a transceiver, and a storage unit connected to the processor and the transceiver to function, the program causing the processor to:
cause the transceiver to receive, from a target device, measurement values related to the target device, wherein the measurement values are measured by the target device at a determination time;
cause the storage unit to store the measurement values;
cause the storage unit to store accumulated measurement values in which the measurement values have been accumulated;
acquire an error vector representing a difference between a measurement value vector having the measurement values measured at the determination time as elements and an average value vector having an average value of the accumulated measurement values as an element;
acquire a component vector having components into which the error vector is decomposed with respect to a direction of a singular vector as elements;
calculate a Mahalanobis distance on the basis of the component vector, variance in the direction of the singular vector, and a correction coefficient with respect to the direction of the singular vector;
determine presence or absence of an abnormality on the basis of the Mahalanobis distance; and
upon determining the presence of the abnormality, cause the transceiver to transmit, to a control device that controls the target device, a notification indicating the presence of abnormality.

* * * * *